US005625612A

United States Patent [19]
Tozune et al.

[11] Patent Number: 5,625,612
[45] Date of Patent: Apr. 29, 1997

[54] DISC CARTRIDGE LOADING APPARATUS

[75] Inventors: Toshimasa Tozune, Saitama; Koichi Numata, Kanagawa, both of Japan

[73] Assignee: Sony Corporation, Tokyo, Japan

[21] Appl. No.: 618,035

[22] Filed: Mar. 18, 1996

Related U.S. Application Data

[63] Continuation of Ser. No. 417,439, Apr. 5, 1995, abandoned, which is a continuation of Ser. No. 64,552, May 19, 1993, abandoned.

[30] Foreign Application Priority Data

| May 22, 1992 | [JP] | Japan | 4-130252 |
| May 22, 1992 | [JP] | Japan | 4-130253 |
| May 22, 1992 | [JP] | Japan | 4-130254 |
| Oct. 6, 1992 | [JP] | Japan | 4-292138 |
| Oct. 8, 1992 | [JP] | Japan | 4-296455 |

[51] Int. Cl.⁶ .......................... G11B 33/02; G11B 17/04
[52] U.S. Cl. ........................ 369/77.2; 360/99.06
[58] Field of Search ............... 369/77.2, 77.1, 369/75.2, 75.1; 360/99.02, 99.06

[56] References Cited

U.S. PATENT DOCUMENTS

| 4,562,498 | 12/1985 | Shibata | 360/99.02 |
| 4,641,211 | 2/1987 | Okita et al. | 360/99.06 |
| 4,707,819 | 11/1987 | Ehara | 360/99.06 |
| 4,723,185 | 2/1988 | Maeda | 369/77.2 |
| 4,901,174 | 2/1990 | Saito et al. | 360/99.06 |
| 4,918,553 | 4/1990 | Suzuki et al. | 360/99.06 |
| 4,987,506 | 1/1991 | Uehara | 360/105 |
| 5,062,099 | 10/1991 | Odawara et al. | 369/263 |
| 5,067,121 | 11/1991 | Einhaus | 369/75.2 |
| 5,123,004 | 6/1992 | Arai | 369/75.2 |
| 5,142,522 | 8/1992 | Muramatsu et al. | 369/75.2 |
| 5,184,342 | 2/1993 | Ishii | 369/100 |
| 5,195,079 | 3/1993 | Inoue et al. | 369/75.1 |
| 5,224,079 | 6/1993 | Inoue | 369/77.2 |
| 5,260,924 | 11/1993 | Hayashi | 369/77.2 |
| 5,297,117 | 3/1994 | Uzuki et al. | 369/75.2 |
| 5,309,421 | 5/1994 | Fujisawa | 369/75.1 |
| 5,384,757 | 1/1995 | Ohmori et al. | 369/75.2 |
| 5,513,054 | 4/1996 | Watanabe | 360/99.06 |
| 5,566,156 | 10/1996 | Choi | 360/99.06 |

FOREIGN PATENT DOCUMENTS

| 0156569 | 10/1985 | European Pat. Off. . |
| 0288126 | 10/1988 | European Pat. Off. . |
| 0293150 | 11/1988 | European Pat. Off. . |

(List continued on next page.)

OTHER PUBLICATIONS

Patent Abstracts of Japan vol. 16, No. 182 (P–1346) Apr. 30, 1992 & JP–A–04 021 946 Toshiba Corp. May 15, 1990.
Patent Abstracts of Japan vol. 14: No. 173 (P–1033) Apr. 5, 1990 & JP–A–02 027 551 (Nakamichi Corp.) Jan. 30, 1990.
Patent Abstracts of Japan vol. 14, No. 173 (P–1033) Apr. 15, 1990, & JP–A–02 027 552 (Nakamichi Corp.) Jan. 30, 1990.

*Primary Examiner*—Stuart S. Levy
*Assistant Examiner*—Allen Cao
*Attorney, Agent, or Firm*—Limbach & Limbach L.L.P.

[57] ABSTRACT

A disc cartridge loading apparatus of simple construction is disclosed which smoothly and securely loads and unloads a disc cartridge. The disc cartridge loading apparatus includes a main slider supported so as to be freely slidable on a chassis. A cartridge holder is supported between the side portions of the main slider so as to slide in upward and downward directions. In addition, a loading slider is provided which slides to and from the cartridge holder. The loading slider includes a hook portion which engages an engaging portion, provided in the side of a disc cartridge, when the cartridge is inserted into the cartridge holder. The loading apparatus is supported in a sub-chassis via damping members in a manner which prevents transmission of vibration from the sub-chassis to the loading apparatus. Further, during loading and unloading operation, engaging members are active to fix the positioning of the loading apparatus as a whole relative to the sub-chassis in the vertical, lateral and longitudinal directions so as to allow smooth and reliable loading and unloading of the disc cartridge.

19 Claims, 16 Drawing Sheets

FOREIGN PATENT DOCUMENTS

| | | |
|---|---|---|
| 3914303 | 10/1990 | European Pat. Off. . |
| 0390211A3 | 9/1991 | European Pat. Off. . |
| 0475595A2 | 3/1992 | European Pat. Off. . |
| 0482585A2 | 4/1992 | European Pat. Off. . |
| 0439286A3 | 1/1993 | European Pat. Off. . |
| 0583946 | 2/1994 | European Pat. Off. . |
| G11B17/022 | 10/1989 | Germany . |
| G11B33/08 | 9/1991 | Germany . |
| 59-5401 | 1/1984 | Japan . |
| 59-217266 | 12/1984 | Japan . |
| 62-146478 | 6/1987 | Japan . |
| 3-98745 | 10/1991 | Japan . |

DISC CARTRIDGE LOADING APPARATUS

This is a continuation of application Ser. No. 08/417,439 filed on Apr. 5, 1995, now abandoned, which is a continuation of Ser. No. 08/064,552 filed on May 19, 1993, now abandoned.

FIELD OF THE INVENTION

The present invention relates generally to a loading apparatus for disc cartridges. More particularly, the present invention relates to a loading apparatus which may load and unload a disc cartridge containing a magneto-optical disc, or the like.

BACKGROUND OF THE INVENTION

Numerous devices are known which utilize various types of disc cartridges. Recently, a format has been introduced which utilizes a small sized magneto-optical disc rotatably mounted in a cartridge casing. Such types of discs utilize a magneto-optical recording method which records a single bit by making a reverse magnetized area on a magnetic film having great coercive force and having a direction of magnetization which is perpendicular to the film face. The recorded bit is reverse magnetized by means of a laser beam or the like. In a reproducing operation, the recorded bit is reproduced via magneto-optical effect.

Generally, such disc cartridges have a casing consisting of upper and lower halves. In use, the disc cartridge is loaded into a disc reproducing and/or recording apparatus via a loading apparatus which correctly positions the disc cartridge relative to a magneto-optical pickup.

Specifically, with reference to FIG. 16, a disc cartridge loading apparatus 100 includes a chassis 101, an ejecting plate 104 which is mounted on two pairs of guide pins 102, 102 and 103, 103 which project from the sides of and are perpendicular to the chassis 101, such that the chassis 101 is slidable in forward and rearward directions. Further, a cartridge holder 110 is mounted on two pairs of slanted cam grooves 104a, 104a which are formed on both sides of the ejecting plate 104. As the ejecting plate 104 moves forward toward the optical pickup 106 located in the middle of the chassis 101, the cartridge holder 110 which retains the disc cartridge moves downward and a chucking hub 202 located at the center portion of the magneto-optical disc 201 of the disc cartridge 200 is magnetically chucked on a turntable 107 and loading operation is complete. After completion of loading, the ejecting plate 104 is locked by a lock lever 109 supported on the chassis 101 by a torsion coil spring 108, or the like.

On the upper face of the cartridge holder 110, both a lever 111 for opening and closing the shutter 203 of the disc cartridge 200 and a misloading detection lever 112 are mounted. The levers 111, 112 are predisposed by a coil spring 113. In addition, a plunger 116 is provided for swiveling upward and downward a support arm 115 which is mounted on the rear side 106a of the optical pickup 106. A magnetic head 114 is mounted at an end of the support arm 115. An mechanism drive motor 117 is operatively associated with the ejecting plate 104 via a series of reduction gears 118 and an ejection gear 119, both of which are set on the rear right side of the chassis 101. The drive motor 117 moves the ejecting plate 104 in the ejecting direction by forcibly pressing the rear edge 104b of the rear portion of the ejecting plate 104. When the ejecting plate 104 is moved on the chassis 101 by both the drive motor 117 and the tensile force of a pair of coil springs 105, 105 set between the chassis 101 and the ejecting plate 104, the cartridge holder 104 slides upward and to the front of the apparatus 100. The disc cartridge 200 held in the cartridge holder 110 is thereby ejected from the loading apparatus.

A construction similar to that described above is disclosed in Japanese Utility Model Application, Laid Open Publication No. 3-98745.

However, the above-described disc cartridge loading apparatus 100 has a disadvantage in that it needs a plurality of energizing means, such as the tension coil springs 105, 105, the torsion coil spring 108, a coil spring 113, etc., for respectively energizing the ejecting plate 104, the lock lever 109 and the shutter opening and closing lever 111. Further, a plunger 116 is required for moving the support arm 115. A drive motor 117 is also necessary. Thus, a large number of parts are required, and the apparatus as a whole becomes heavy and large as well as high in cost.

Also, when such a conventional loading arrangement is mounted in the housing of a disc reproducing and/or recording apparatus, it may be subjected to vibration which may cause misoperation of the loading apparatus, or positional dislodgement of the disc cartridge.

Thus, it has been required to provide a highly reliable loading apparatus for such a disc cartridge apparatus which utilizes a reduced number of parts so as to achieve smaller size and to reduce costs.

SUMMARY OF THE INVENTION

It is therefore an object of the present invention to provide a loading apparatus which resolves the above-mentioned problems.

It is a further object of the present invention to provide a disc cartridge loading apparatus which provides a highly reliable loading apparatus for a disc cartridge apparatus and while utilizing a reduced number of parts. The disc cartridge loading apparatus provided by the invention is thus smaller in size and lower in cost while providing smooth, secure loading of a disc cartridge.

It is another object of the present invention to provide a disc cartridge loading apparatus supported in a manner such that vibration subjected to a disc playing/recording apparatus is not transmitted to the loading apparatus.

In order to accomplish the aforementioned and other objects, a disc cartridge loading apparatus is provided, including a main slider supported so as to be freely slidable on a chassis, as well as a cartridge holder which is supported so as to be freely moved upward and downward between side members of the main slider. The cartridge holder receives a disc cartridge between side portions thereof. The disk cartridge loading apparatus also includes a loading slider which is supported so as to be freely slidable on the cartridge holder and having a hook portion on one side thereof engageable with an engaging groove provided on the corresponding side of the disc cartridge. Also included is a drive motor for selectively moving the disc cartridge, which is both fully inserted into the disc holder and engaged with the hook portion of the loading slider, in either a loading or unloading direction according to sliding movement of the loading slider. Further included is a mechanism for raising and lowering the cartridge holder and the loading slider relative to the main slider according to sliding movement of the main slider.

Another aspect of the present invention is a disc cartridge loading apparatus including optical and magnetic heads for reproducing and/or recording data on a magneto-optical disc. This loading apparatus includes both a main slider supported so as to be freely slidable on a chassis and a cartridge holder which receives a disc cartridge between side portions thereof and is supported so as to be freely moved upward and downward between side members of the main slider. The loading apparatus further includes a loading slider which is supported so as to be freely slidable on the cartridge holder and which has a hook portion on one side thereof engageable with an engaging groove provided on the corresponding side of the disc cartridge. Also included is a drive motor for selectively moving the disc cartridge, which is both fully inserted into the disc holder and engaged with the hook portion of the loading slider, in either a loading or unloading direction according to sliding movement of the loading slider. The loading apparatus further includes a mechanism for raising and lowering the cartridge holder and the loading slider relative to the main slider according to sliding movement of the main slider. Moreover, a rack is arranged on the outer side of the main slider. A drive gear is engaged to the rack and driven by the drive means. The loading slider is slid forward or backwards, into or out of the cartridge holder via a drive gear driven by the drive means, such that a disc cartridge, when engaged with the hook portion of the loading slider, can be selectively drawn in to or ejected from the loading apparatus. The cartridge holder and the loading slider are constructed so as to move vertically relative to the main slider by reciprocating the sliding action of the main slider forward or rearward via rotation of the drive gear. The loading apparatus also includes a supporting arm on which is mounted the magnetic head for recording data on the disc contained in the disc cartridge. The supporting arm is supported in a manner so as to be movable in a vertical direction with respect to the chassis via a cam engaged with a cam groove which is formed in the rack of the main slider.

According to a further aspect of the invention, a disc cartridge loading apparatus is provided which includes an outer casing having a chassis mounted therein and a main slider supported so as to be freely slidable on the chassis. Further included is a cartridge holder which receives a disc cartridge between side portions thereof and which is supported so as to be freely moved upward and downward between side members of the main slider. Also included is a loading slider which is supported so as to be freely slidable on the cartridge holder and which has a hook portion on one side thereof engageable with an engaging groove provided on the corresponding side of the disc cartridge. Further, the loading apparatus includes a drive means for selectively moving the disc cartridge, which is both fully inserted into the disc holder and engaged with the hook portion of the loading slider, in either a loading or unloading direction according to sliding movement of the loading slide. Also included are: means for raising and lowering the cartridge holder and the loading slider relative to the main slider according to sliding movement of the main slider, a plurality of damper mechanisms between the disc cartridge loading apparatus and the outer casing such that the loading apparatus is movable in three dimensions relative the outer casing, and engaging members which are engageable with corresponding engaging members on the outer casing so as to positionally fix the disc cartridge loading apparatus in the three dimensions during upward movement of the cartridge holder.

DESCRIPTION OF THE PREFERRED EMBODIMENT

Figure 2:
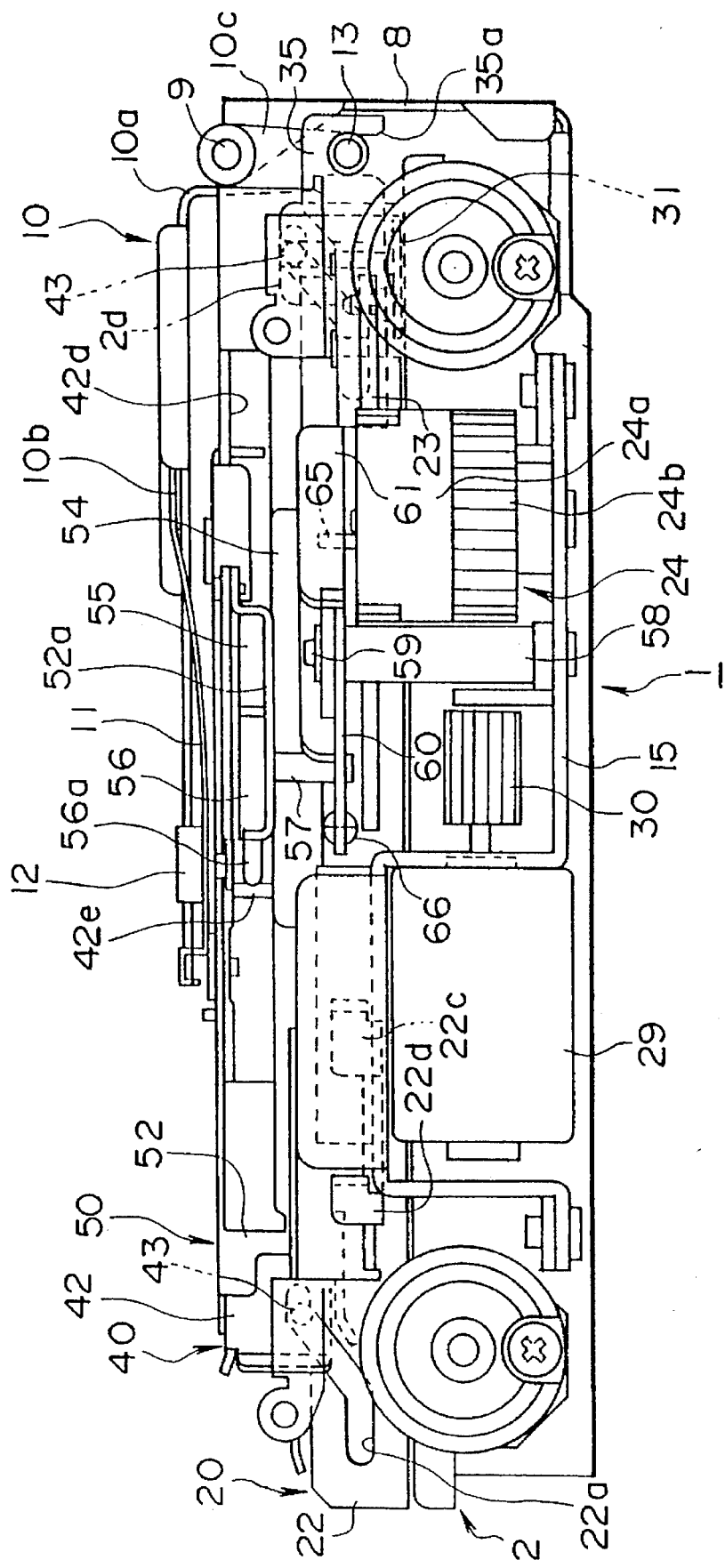
FIG. 2 is a side view of the disc cartridge loading apparatus of FIG. 1.
Figure 3:
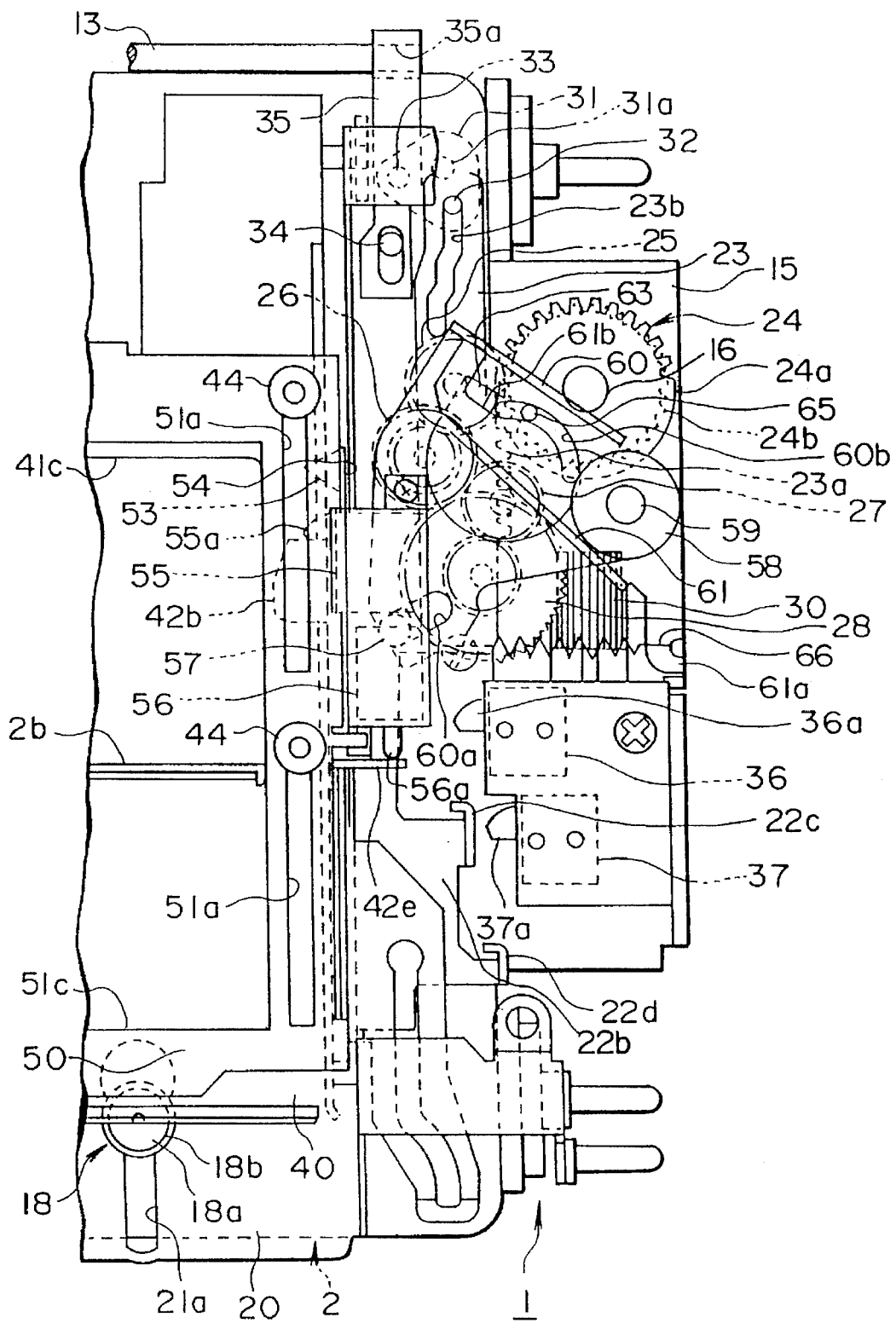
FIG. 3 is a partial plan view of the disc cartridge loading apparatus of the first embodiment in an initial position thereof.
Figure 4:
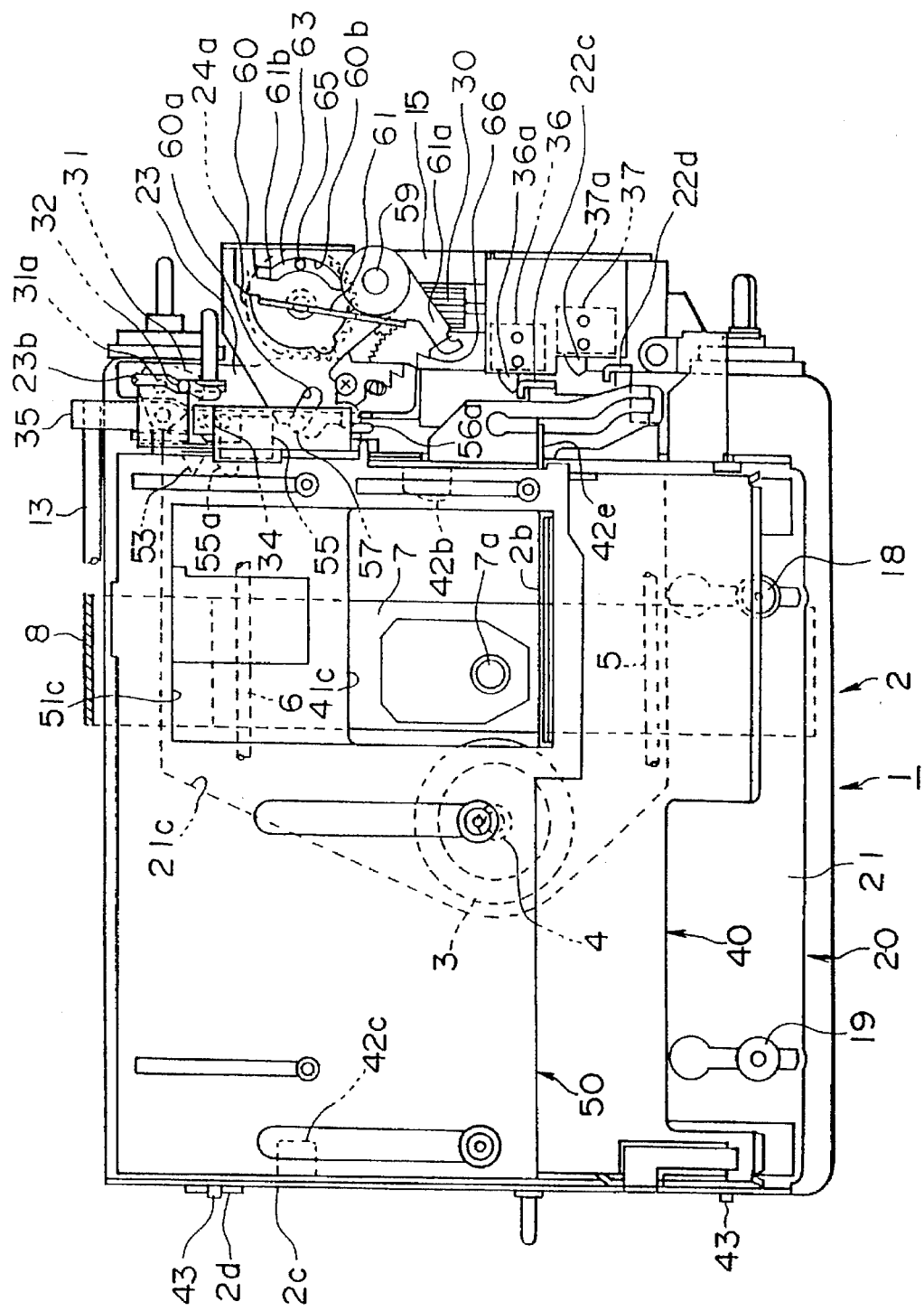
FIG. 4 is a plan view of the loading apparatus of the first embodiment in a play enable position thereof.

Referring now to the drawings, particularly to FIGS. 1 through 5, a disc cartridge loading apparatus 1 according to the first embodiment of the invention receives a small size disc cartridge 70 which has rotatably mounted therein a magneto-optical disc 71. The disc cartridge 70 may be slidably loaded and unloaded (ejected) from the loading apparatus 1. The loading apparatus 1 includes a sheet metal chassis 2 having a turntable 3 provided at a substantially centered location thereof. The turntable 3 is rotatably connected to the output shaft 4 of a motor (not shown). On the right side portion 2a of the chassis 2, a cut-out 2b (see FIG. 3) formed therein is provided. The cut out 2b extends from the middle area of the chassis 2 to the right side portion 2a thereof. Referring to FIG. 4, opposite the cut out 2b, a slide guide shaft 5 is provided at the lower side of the chassis 2. An optical pickup 7 is disposed under the chassis 2 and facing the cut out 2b. The pickup 7 is mounted by way of the slide guide shaft 5 and a receiving screw 6 so as to be movable in the radial direction of the turntable in a manner to enable reading and/or writing of the optical disc 71.

Referring to FIG. 4, directions of movement used to describe operation of the invention are forward (downward in FIG. 4) and rearward (upward in FIG. 4). In addition, the direction to the right in FIG. 4 is referred to as the right side of the loading apparatus while the direction to the left in FIG. 4 is referred to as the left side. Also, upward and downward directions refer to vertical movement of portions of the apparatus.

Figure 1:
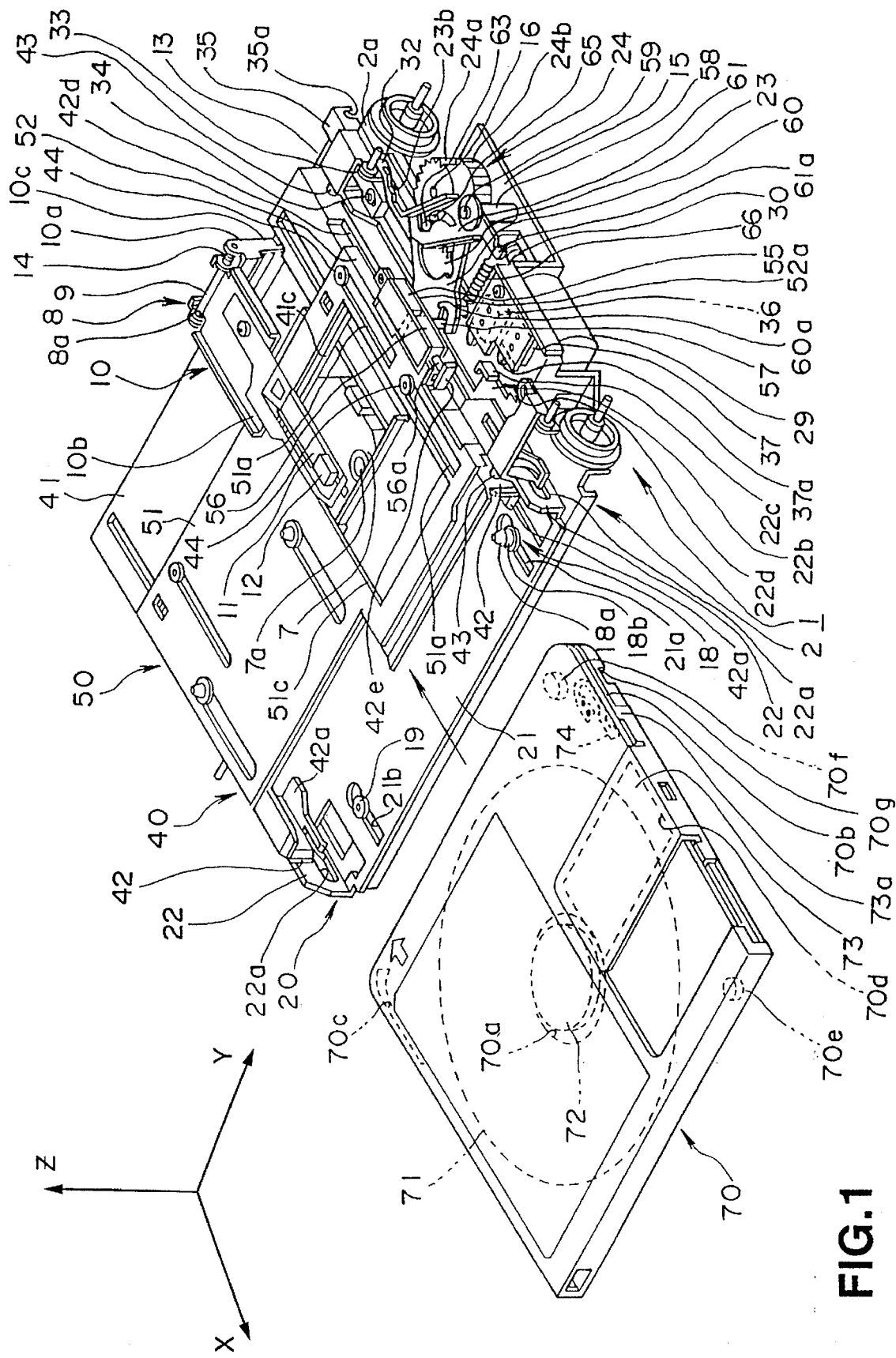
FIG. 1 is a perspective view of a disc cartridge and a cartridge loading apparatus therefor according to a first embodiment of the invention.

As may be seen in FIGS. 1 and 2, a rear lower surface portion of the optical pickup 7 is attached to a substantially L-shaped support plate 8. The support plate 8 is formed with opposing holes 8a, 8a in the upper side surface thereof for mounting the support plate 8 via a shaft member 9 to the upright portion 10a of an L-shaped support arm 10, such that the support plate is movable in upward and downward directions. A gimbal 11 is projected from the edge portion 10b of the support arm 10 so as to be positioned over the cut-out 2b. Mounted at the end of the gimbal 11 is a magnetic head 12 such that an object lens 7a of the optical pickup 7 is interposed between the magnetic head 12 and the optical pickup 7. Further, the lower edge portion 10c of the support arm 10 is mounted on an axis member 13 such that the support arm 10 is held above the right side portion 2a of the chassis 2. Further, the upright portion 10a of the support arm 10 is mounted to the shaft member 9 such that the edge portion 10b of the support arm 10 is always predisposed in the upward direction via a coil spring 14.

In addition, as seen in FIG. 1, a pair of first guide pins 18, 18, aligned in forward and rearward directions and in parallel with each other, are projected from the right side of the chassis 2 proximate to the right side portion 2a. Second guide pins 19, 19, which are also aligned in parallel to forward and rearward sides, are projected from the chassis 2 at the left side 2c thereof. Each of the first guide pins 18 includes both an inverted conical head portion 18a and a cylindrical shaft portion 18b and serves as a positioning pin to determine the position of a fully loaded disc cartridge 70. One the other hand, each of the second guide pins 19 has a substantially flat upper portion and a generally T-shaped configuration. Slidably disposed above the chassis 2 via the first and second guide pins 18, 18 and 19, 19 is a main slider 20. The first and second guide pins 18, 18 and 19, 19 respectively engage elongate openings 21a and 21b of the main slider 20 such that the main slider 20 is movable in forward and rearward directions by a predetermined distance (i.e. 7 mm).

The main slider 20 is generally U-shaped and comprises a lower plate portion 21 and side portions 22, 22. Furlher, the lower plate portion 21 has a generally rectangular cut out 21c (see FIG. 4) formed therein at a position opposing the cut out portion 2b of the chassis 2. Each of the opposing side portions 22, 22 of the main slider 20 has a cam groove 22a formed therein respectively.

The right side 22 of the main slider 20 has a flat side member 22b integrally formed therewith by a bending process or the like. The flat side member 22b has mounted a rack 23 thereon which is attached by a screw, for example. The flat side member 22b further includes comer portions 22c and 22d which are integrally foraged therewith by a bending process.

Figure 5:
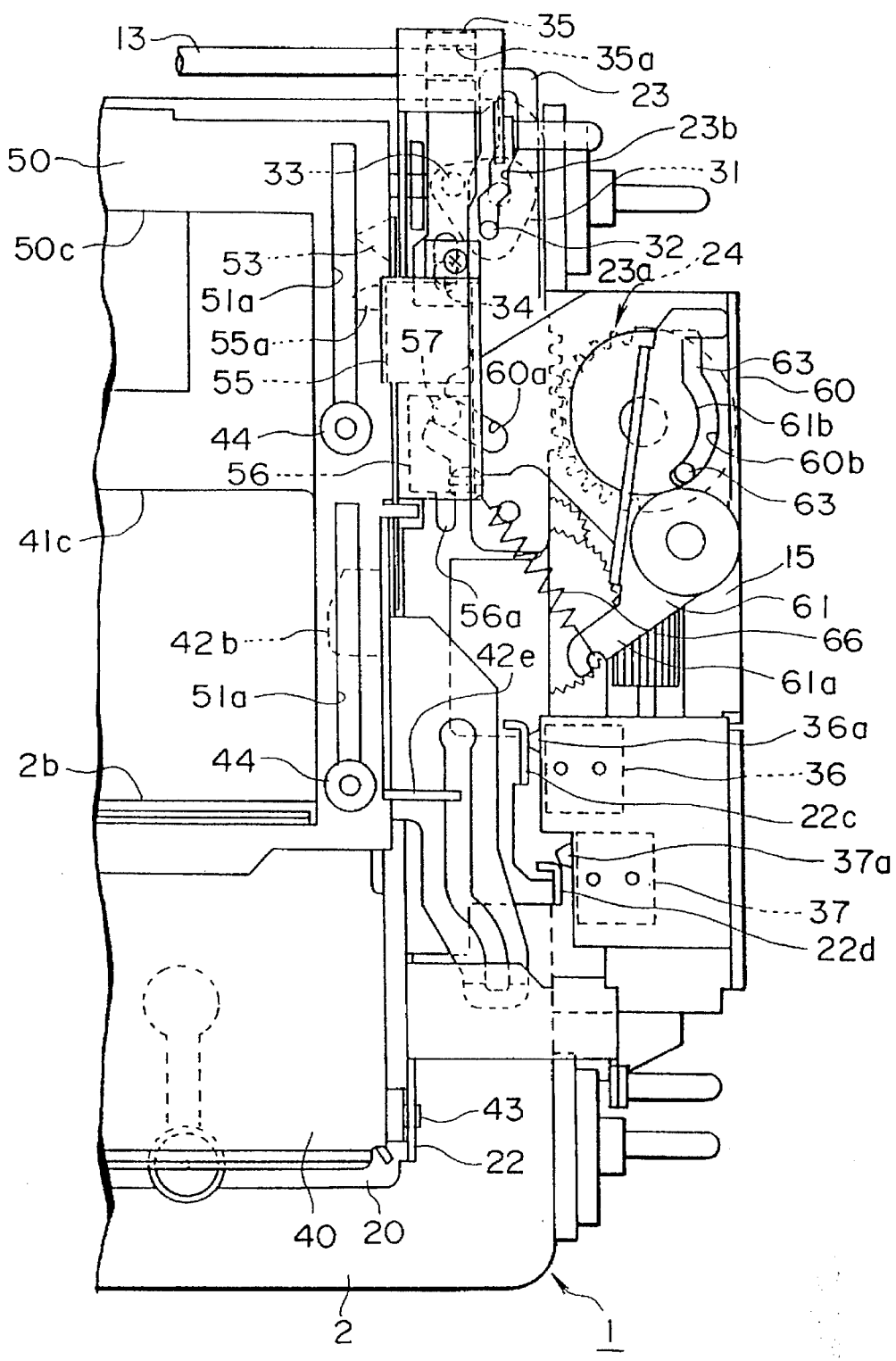
FIG. 5 is an partial plan view of the loading apparatus of FIG. 4 in a record enable position thereof.

As seen in FIGS. 1 and 5, along the outer side of the rack 23, teeth portions 23a are formed. The teeth 23a engage a drive gear 24. The drive gear 24 includes a partially toothed upper gear portion 24a and a fully toothed lower gear portion 24b. The drive gear 24 is rotatably supported on an shaft 16 which is projected from a sub-chassis 15. The sub-chassis 15 is attached to the right side portion 2a of the chassis 2 by, for example, screws.

The lower gear portion 24b of the drive gear 24 is engaged with a worm gear 30 driven by a loading motor 29 via a series of speed reduction gears 25 to 28. The loading motor 29 is mounted on the sub-chassis 15. According to forward or reverse rotational output of the loading motor 29, the main slider 20 is driven in either a forward or rearward direction relative to the chassis 2.

Figure 6:
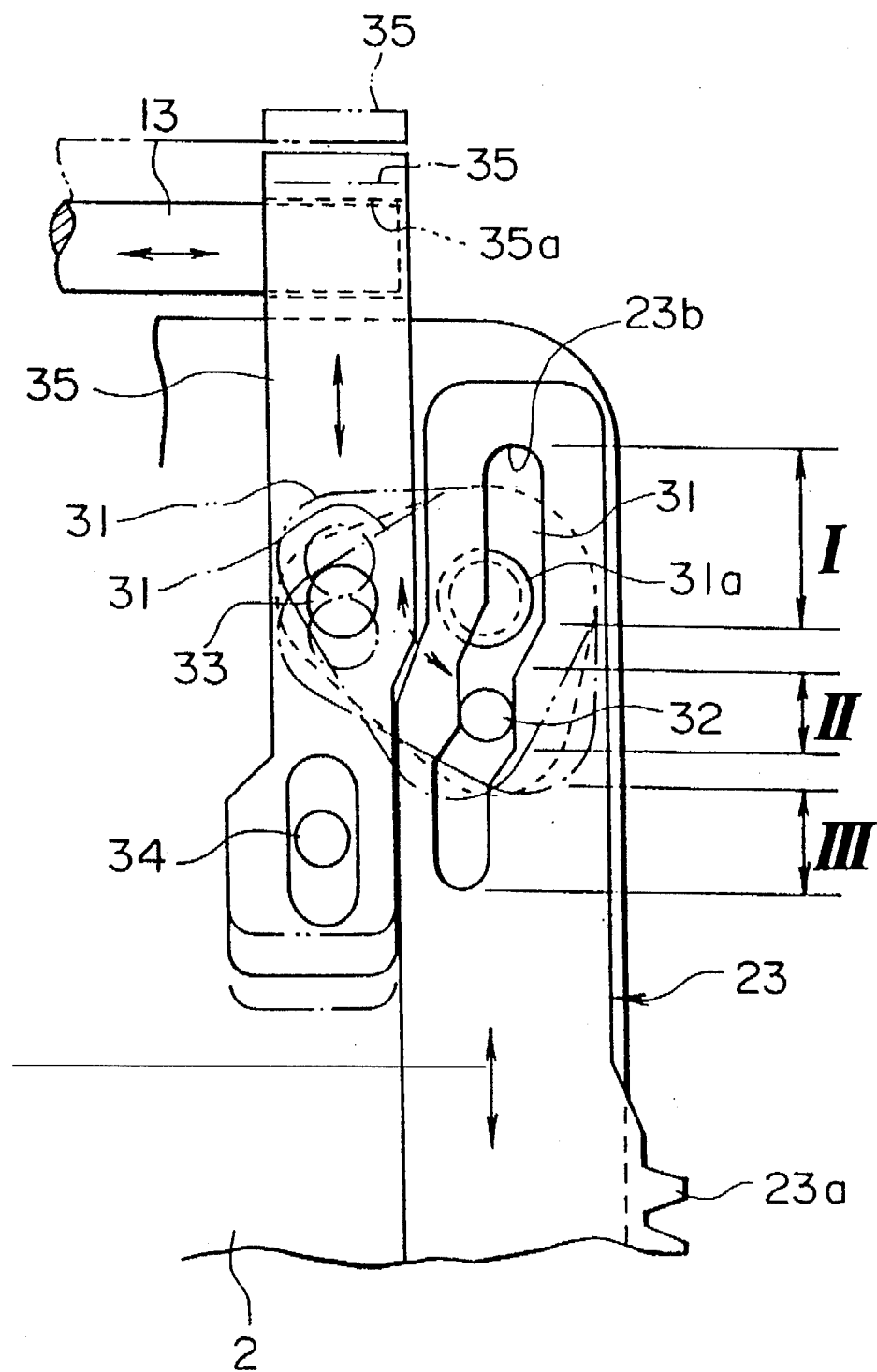
FIG. 6 is an enlarged plan view of a swing plate portion of the loading apparatus of the first embodiment showing a position of the swing plate according to a selected function of the disc cartridge loading apparatus.

Referring now to FIG. 6, numerals I, II, and III represent respective portions along the length of the cam groove 23b of the rack 23. The cam groove 23b receives the cam pin 32 of the triangular cam 31. The cam 31 is disposed below the rack 23 and is mounted to the upper surface of the chassis 2 via a pivot pin 31a. A pin 33 is projected from the top portion of the main slider 20. The pin 33 is adjacent to a stationary pin 34 of the chassis 2 and is slidable in forward and rearward directions in conjunction with a slide plate 35. The slide plate 35 is foraged with a concave portion 35a on the lower side thereof. The concave portion 35a supports the slide plate 35 on the axis member 13 which also pivotally supports the upright portion 10c of the support arm 10 as described above. According to sliding movement of the main slider 20 in the forward and rearward directions, the rack 23 is also moved in forward and rearward directions, which in turn determines the height of the edge portion 10b of the support arm 10 from among three different elevations. That is, referring to FIG. 6, when the cam pin 32 of the cam 31 is engaged at the I section of the cam groove 23b of the rack 23, the elevation of the support arm 10 is such that the magnetic head mounted thereon assumes a position separate from the lens 7a of the optical pickup 7 (i.e. standby position). When the cam pin 32 of the cam 31 is in the II section of the cam groove 23b of the rack 23, the elevation of the support arm 10 is effected such that the magnetic head 12 is positioned adjacent the lens 7a of the optical pickup 7 (play position). When the cam pin 32 of the cam 31 is in the III section of the cam groove 23b of the rack 23, the elevation of the support arm 10 is effected such that the magnetic head 12 is positioned closely adjacent the lens 7a of the optical pickup 7 (record position). In the play position, as seen in FIG. 4. the lever 36a of the first position determining switch 36 mounted on the sub-chassis 15 contacts the comer portion 22c of the fiat side member 22b of the main slider 20 so as to detect the position thereof. In the record position, as seen in FIG. 5, the lever 37a of the second position determining switch 37 contacts the other comer portion 22d of the fiat side member 22b so as to detect that the record position has been established.

Between the side portions 22, 22 of the main slider 20, the cartridge holder 40 for retaining the disc cartridge 70 is supported so as to be movable in upward and downward directions. The cartridge holder 40 comprises a plate member 41 having side members 42, 42 integrally formed therewith such that the cartridge holder has an inverted U-shape configuration.

The plate member 41 of the cartridge holder 40 has a rectangular cut-out 41c formed therein so as to oppose the cut-out 2b of the chassis 2. Referring to FIG. 4, each of the side members 42, 42 of the cartridge holder 40 has forward and rearward engagement pins 43, 43 projecting outwardly therefrom such that the forward pins 43 engage the cam grooves 22a, 22a of the side portions 22, 22 of the main slider 20 and the rear pins 43 engage concave portions 2d formed at reanvard portions of the right side portion 2a and the left side 2c of the chassis 2. In addition. projecting inwardly from the lower sides of the side members 42, 42 of the cartridge holder 40 are cartridge support tabs 42a, 42a. Moreover, at a central inner portion of the right side member 42 and a rear inner portion of the left side member 42 of the cartridge holder 40, respective projection portions 42b and 42c are formed for engaging corresponding cartridge guide grooves 70b and 70c formed respectively on the right and left sides of the disc cartridge 70. Further, at the upper side of the right side portion 42 of the cartridge holder 40, an elongate groove 42d is formed and, at a position forward of the elongate groove 42d, an outwardly extending projection 42e is formed integrally with the right side member 42 by a bending process or the like. The upper surface of the plate member 41 has a pair of guide pins 44, 44 projected therefrom at forward and rearward locations on either side of the disc cartridge 70 relative to the optical pickup 7.

Referring to FIGS. 1 and 4, a loading slider 50 for eject operations and the like, is slidably mounted over the cartridge holder 40. The loading slider 50 may be made of sheet metal, for example, and comprises a horizontal plate portion 51 and a downwardly projecting side portion 52 formed integrally therewith by a bending process or the like, thus giving the loading slider a substantially L-shaped configuration. The plate portion 51 of the loading slider is provided with guide grooves 51a, 51a extending in a front to rear orientation relative to the plate portion 51. The guide grooves 51a, 51a are engaged by the guide pins 44, 44 of the cartridge holder 40 so as to be slidably movable relative thereto. The plate portion 51 further has a rectangular cut-out 51c formed at a location opposite the cut-out 41c of the cartridge holder.

At the lower side of the side portion 52 of the loading slider 50, an inwardly projecting triangular hook portion 53 (FIG. 5) is provided which is predisposed by a plate spring 54 so as to engage the engaging portion 70g of the disc cartridge 70. Also, at the lower side of the side portion 52, at a substantially central portion thereof, a horizontal projecting portion 52a is formed. At the rear side of the projecting portion 52a, a disc insertion completion detecting switch 55 is installed and, on the forward side of the projecting portion 52a, a disc ejection completion detecting switch 56 is provided. The insertion completion detecting switch 55 has an actuating lever 55a projected therefrom so as to be inserted into the elongate groove 42d of the side member 42 of the cartridge holder 40. The ejection completion detecting switch 56 includes an actuating lever 56a projected in a forward direction so as to be contactable by the projection 42e of the side member 42 of the cartridge holder 40.

Further, referring to FIGS. 3-5, the projecting portion 52a has a pin 57 projecting vertically downward from the lower center portion thereof and is fixed by caulking or the like. The pin 57 stands on the sub-chassis 15 so as to engage the concave portion 60a of a first oscillating plate 60 mounted on the axis 59 of a support brace 58. The first oscillating plate 60 has an arc-shaped cam groove 60b formed at the side facing the drive gear 24. Also, a second oscillating plate 61 is mounted above the first oscillating plate 60 commonly on the axis 59, so as to be freely pivotable thereon. The second oscillating plate 61 has a cam groove opening 63 having a cam surface 61b formed therein at the side of the drive gear and the above-mentioned cam groove 60b of the first oscillating plate 60. A drive pin 65, eccentrically projected from the top of the drive gear 24, is inserted into the cam groove opening 63 of the second oscillating plate 61 such that according to rotation of the drive gear 24, the loading slider 50 may be urged to slide backwards or forwards relative to the cartridge holder by a predetermined distance (i.e. 16.5 mm). Furthermore, a coil spring 66 is arranged between the first oscillating plate 60 and an end portion 61a of the second oscillating plate 61.

Hereinbelow the structure of the disc cartridge 70 according to the invention will be described in detail with reference to FIG. 1.

As described above and as may be seen in FIG. 1, the disc cartridge 70 is has a space between upper and lower halves thereof in which a small size (i.e. 65 mm) magneto-optical disc 71 is rotatably disposed. The magneto-optical disc 71 has a chucking hub 72 provided at a center portion thereof. The lower side of the chucking hub 72 is accessible through a chucking opening 70a provided on the lower side of the disc cartridge 70. Further, a long guide groove 70b is formed on one side of the disc cartridge 70 in the longitudinal directions thereof and a short guide groove 70c is formed on the opposite side. The side having the long guide groove 70b further has an opening 70d formed through both upper and lower haves of the disc cartridge 70 for allowing access to the magneto-optical disc 71 for reading and writing thereof. The opening 70d is covered by a slidably disposed shutter 73 having a reverse C-shape configuration. Furthermore, on the bottom of the disc cartridge 70 at forward and rearward locations on the same side as the long guide groove 70b a circular opening 70e and a slightly elongate opening 70f are formed respectively. Also, a engaging portion 70g is formed below the long guide groove 70b at a location so as to engage an edge member 73a of the shutter 73. Projecting into the disc cartridge 70, a U-shaped lock lever 74 formed at an end of the edge member 73a of the shutter 73 is provided such that when the lock lever closes the long guide groove 70b, a locked condition of the disc cartridge 70 is established. Further, a spring (not shown) is provided so as to predispose the shutter 73 in a closing direction.

According to the above described embodiment of a disc loading apparatus 1 according to the invention, the disc cartridge 70 is inserted into the cartridge holder 40 such that the projecting portion 42b of the side member 42 of the cartridge holder 40 is inserted into the long guide groove 70b of the disc cartridge 70 such that the locked condition of the disc cartridge 70 is released. When the disc cartridge 70 is inserted into the cartridge holder 40, the hook portion 53 (FIG. 5), which projects from the side portion 52 of the loading slider 50 through the side member 42 of the cartridge holder 40, engages the engaging portion 70g of the disc cartridge 70. In this condition, the actuation lever 55a of the insertion completion detecting switch 55 is pressed by the side of the disc cartridge 70, so as to cause the insertion completion detecting switch 55 to assume an ON condition. The ejection completion detecting switch thus assumes an OFF condition and the loading motor 29 becomes activated. Only when the disc cartridge 70 is completely inserted into the cartridge holder 40 will the disc loading apparatus assume the initial position as shown in FIG. 3. The projecting portion 42b of the side member 42 of the disc holder 40 and the insertion completion detecting switch 55 mounted on the side portion 52 of the loading slider 50 collectively act to prevent misloading of the disc cartridge 70.

After insertion of the disc cartridge 70 into the cartridge holder 40 is completed, the loading motor 29 is turned on to activate the worm gear 30 associated therewith, driving the speed reduction gears 25-28 so as to rotate the drive gear 24 in a clockwise direction. Consequent to such rotation of the drive gear 24, the eccentrically located drive pin 65 projecting from the top of the drive gear 24 is moved in the rearward direction, causing the oscillating plates 60 and 61 to be rotated also in the clockwise direction, as seen in FIG. 3. Consequently, the loading slider 50 opposite the cartridge holder 40 slides in the rearward direction. Upon rearward movement of the loading slider, the hook portion 53 thereof, which is engaged with the engaging portion 70g of the disc cartridge, pulls the disc cartridge 70 so as to position same over the turntable 3. Simultaneous to this movement, the projecting portion 42b of the cartridge holder opens the shutter 73 of the disc cartridge 70.

After completion of the pulling operation of the disc cartridge 70 by the loading slider 50, the upper toothed portion 24a of the drive gear 24 engages the rack 23 of the main slider 20. Accordingly, the main slider 20 slides in the rearward direction relative to the chassis 2. Moreover, the pins 43, 43 provided at each side of the cartridge holder 40 slide in the cam grooves 22a, 22a provided in each of the side portions 22, 22 of the main slider 20, so as to lower the cartridge holder in the direction of the turntable 3. In case of selection of the play mode of the magneto-optical disc 71 of the disc cartridge 70, as seen in FIG. 4, the actuation lever 36a of the first position detecting switch 36 contacts the first corner portion 22c of the main slider 20 to determine a first position for stopping sliding motion of the main slider 20. Alternatively, if the record mode of the magneto-optical disc is selected, as seen in FIG. 5, the rack 23 etc., are driven such that sliding motion of the main slider 20 in the rearward direction is continued further until the actuation lever 37a of the second position detecting switch 37 contacts the second corner portion 22d of the main slider. Then, as mentioned above, the cartridge holder 40 and the loading slider 50 are lowered by a predetermined distance (i.e. 3.2 mm). With this, the disc cartridge 70, supported by the cartridge holder 40 and the loading slider 50, is lowered toward the main slider 20 such that the head portions 18a, 18a of the positioning pins 18, 18 are respectively inserted into the circular positioning guide opening 70e,and the elongate guide opening 70f of the disc cartridge 70 such that the disc cartridge 70 is securely and accurately positioned on the chassis 2 in the longitudinal and lateral directions (hereinbelow X and Y directions).

When loading operation of the disc cartridge is completed, the disc cartridge 70 is securely held such that the magneto-optical disc 71 is without looseness or play in the radial direction thereof, and engagement of the magneto-optical disc 71 of the disc cartridge 70 in either play or record operations is possible. Further, the rack 23 of the main slider 20 is moved slightly by the second swing plate 61 to assure that firm engagement of the rack 23 with the upper toothed portion 24a of the drive gear 24 is maintained.

When the main slider 20 moves to the first position detecting switch 36 and stops in the play position (i.e. 5 mm from an initial position), the rack 23 is positioned as shown in FIGS. 4 and 6. At this time, the cam 31 underneath the rack 23 moves the slide plate 35 to the position shown by the middle, solid line of FIG. 6. Thus the support arm 10, with the magnetic head 12 mounted upon it, swings to a position such that the end portion thereof is adjacent the optical pickup 7. On the other hand, when the main slider 20 slider moves to the second position detecting switch 37 and stops in the record position (i.e. 7 mm from an initial position) the rack 23 is positioned such that the cam 31 underneath the rack 23 moves the slide plate 35 to the position shown by the two-dot chain line of FIG. 6. Accordingly, the support arm 10, with the magnetic head 12 mounted upon it, swings to a position such that the end portion thereof is more closely adjacent to the optical pickup 7. In addition, a standby position of the support arm 10 of the optical pickup 7 is adopted when the slide plate 35 is moved to the position shown by the lower single-dot chain line of FIG. 6. It will further be noted that, in the play position of the loading apparatus 1 the optical pickup 7 is active and in the recording position thereof both the optical pickup 7 and the magnetic head 12 are active.

For the eject operation of the disc cartridge 70, the loading motor 29 is driven in the opposite direction, causing the cartridge holder 40 and the loading slider 50 to be moved oppositely to the motion described above. Accordingly, as best seen in FIG. 2, the loading slider 50 slides until the actuating lever 56a of the eject completion detecting switch 56 mounted thereon contacts the projecting portion 42e of the cartridge holder. This contact places the eject completion detecting switch in an ON state. Thus, ejection of the disc cartridge 70 from the loading apparatus 1 is completed.

According to the above, smooth, secure loading and unloading of the disc cartridge can be accomplished with a simple construction. The hook portion 53 of the loading slider engages the engaging portion 70g of the disc cartridge 70 when the disc cartridge 70 is inserted into the cartridge holder 40 so as to pull the disc cartridge 70 back and forth according to movement of the loading slider 50. Additionally, the main slider 20 slides so as to oppose the cartridge holder 40 and the loading slider 50 during loading and unloading operations. Thus, the coil springs etc. for providing pulling force as well as the lock and lock lever arrangements of conventional disc loading arrangements are not necessary. Further, according to the above described construction, the overall width of the loading apparatus can be reduced and the base cost is also reduced. Thus, the arrangement according to the invention provides simple structure, smaller and thinner size, and reliable operation all at once.

Additionally, the projecting portion 42b of the right side portion 42 serves to open and close the shutter 73 of the disc cartridge 70 simply and easily, corresponding to loading and unloading movement of the loading slider 50. Therefore, a shutter opening and closing lever as employed in the prior art is not required, further reducing both size and cost of the entire disc reproducing and/or recording apparatus 500 (see FIG. 15). Also, since the insertion completion detecting switch 55 is provided on the right side portion 52 of the loading slider, rearwardly of the projecting portion 42b, the loading slider 50 is operative only when the disc cartridge has been completely and correctly inserted into the cartridge holder 40. Misloading of the disc cartridge is thus prevented. It is also noted that as the projecting portion 42e of the right side 42 of the cartridge holder 40 is associated with the eject completion detecting switch 56 mounted on the side portion 52 of the loading slider, smooth ejection of the disc cartridge 70 from the loading apparatus 1 is also assured.

Further, operation of the main slider 20 and the loading slider 50 are both controlled by a single motor 29 by way of the rack 23 and the oscillating plates 60 and 61, making the driving source as small as possible and further contributing to lower costs as well as miniaturization of the unit as a whole. Via the movement of the rack 23, the support arm 10, with the magnetic head 12 mounted upon it, can be freely and easily switched between the standby position, the play position, and the record position, further reducing the number of parts, weight, costs etc., of the unit. Correct positioning for either the play or record position is assured by the interaction of the position detecting switches 36 and 37 mounted on the chassis 2 with the respective corner portions 22c and 22d of the side portion 22 of the main slider 20.

Thus, according to the invention, a disc cartridge loading apparatus is provided which reliably allows smooth loading and ejecting of disc cartridges. The apparatus features a simplified construction using a reduced member of parts. Costs and weight as well as size and complexity of the disc cartridge playing/recording apparatus are reduced.

Hereinbelow, a second embodiment of a disc cartridge loading apparatus according to the invention will be described in detail with reference to FIGS. 7–15.

Figure 16:
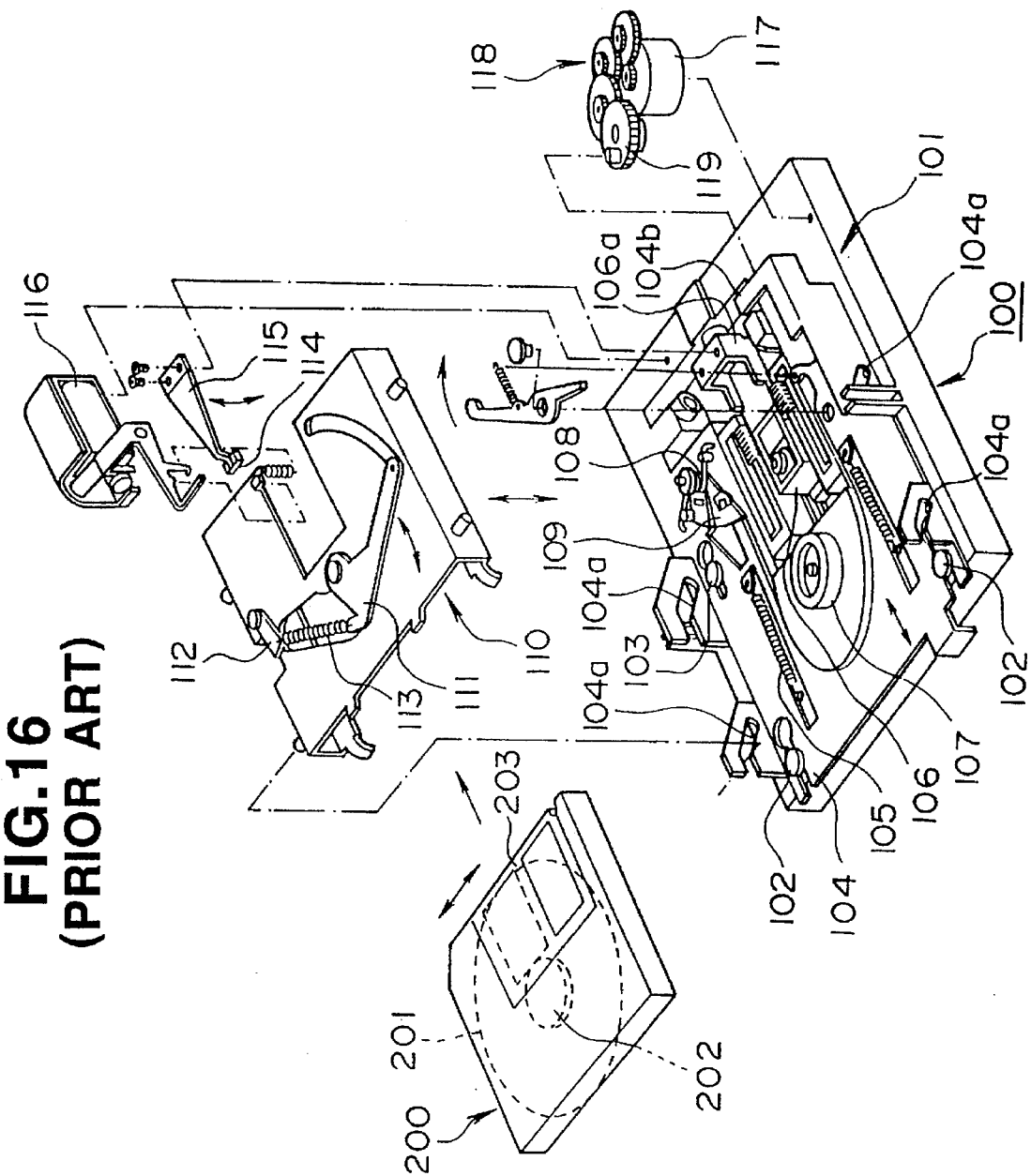
FIG. 16 is an exploded perspective view of a conventional disc cartridge loading apparatus.

According to the second embodiment of a disc loading apparatus, during loading, the cartridge holder 40 is moved upward by sliding motion of the main slider 20. The cartridge holder 40 is fixed in X and Y directions. Namely the longitudinal and lateral directions, in relation to an outer casing of the disc reproducing and/or recording apparatus 500 (see FIG. 16), as described above in relation to the first embodiment. However, according to the second embodiment, the main slider 20 is also secured in the vertical direction (hereinbelow Z direction) with respect to the outer casing via a forked engaging member 122f. Thus the main slider 20, cartridge holder 40, and disc cartridge 70 are all stably held in X, Y and Z directions, assuring accurate reading and/or writing of the disc cartridge and preventing dislodgement or erroneous operation of the disc cartridge due to motion or external shock applied to the disc reproducing and/or recording apparatus 500.

The disc loading apparatus 100 according to the second embodiment includes a turntable 3, constituting the drive mechanism, which is mounted on the shaft 4 of a motor (not shown) at a substantially centered area of the chassis 2. The chassis has a cut-out portion 2b of a substantially rectangular shape formed from the center of the chassis toward the right side portion 2a. Basically, the arrangement of the chassis 2, the main slider 20, the cartridge holder 40, and the loading slider 50 are structurally similar to the arrangement of the above described first embodiment. Detailed description for such similar structure will be omitted and identical reference numbers will be used.

Figure 8:
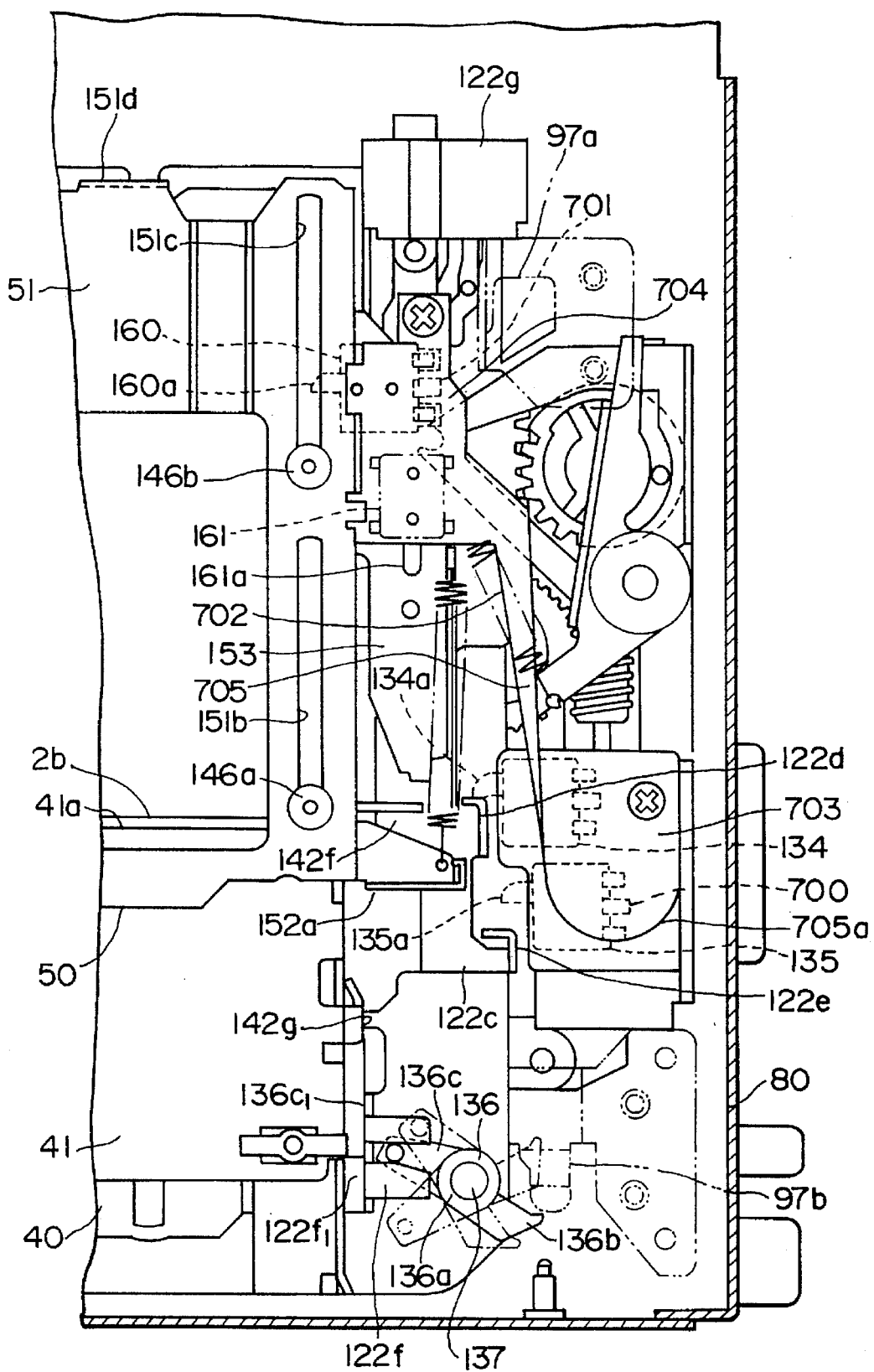
FIG. 8 in an enlarged plan view of a main portion of the disc loading apparatus of the second embodiment.

Referring now to FIGS. 8–15, according to the present embodiment, the right side portion 122a of the main slider 20 includes a horizontally disposed forked engaging piece 122f, as seen in FIG. 8. Further, a support piece 122g is horizontally disposed at the top rear portion of the right side portion 122a of the main slider 20. Moreover, a support pin 122h is projected horizontally outward of the left side portion 122b of the main slider 20.

The loading apparatus of the second embodiment is also equipped with a rack 23 as shown in FIG. 6, by which the cartridge holder 40 may be selectively moved between a standby position, a play position and a record position in an identical fashion to the first embodiment.

Further, according to the present embodiment, the forked engaging piece 122f, formed on the upper edge portion of the front end of the right side portion 122a of the main slider 20, engages a rotary support body 136 which is axially mounted on the chassis 2.

The rotary, support body 136 includes a shaft cylinder section 136a which surrounds a shaft pin 137, mounted on the chassis 2. The rotary support body 136 may rotate upon the shaft pin 137. The rotary support body 136 further includes a support arm portion 136b and an engaging arm portion 136c projected horizontally therefrom. The engaging arm portion 136c includes a protrusion 136c1 which engages the forked section 122f1 of the forked engaging piece 122f.

Figure 9:
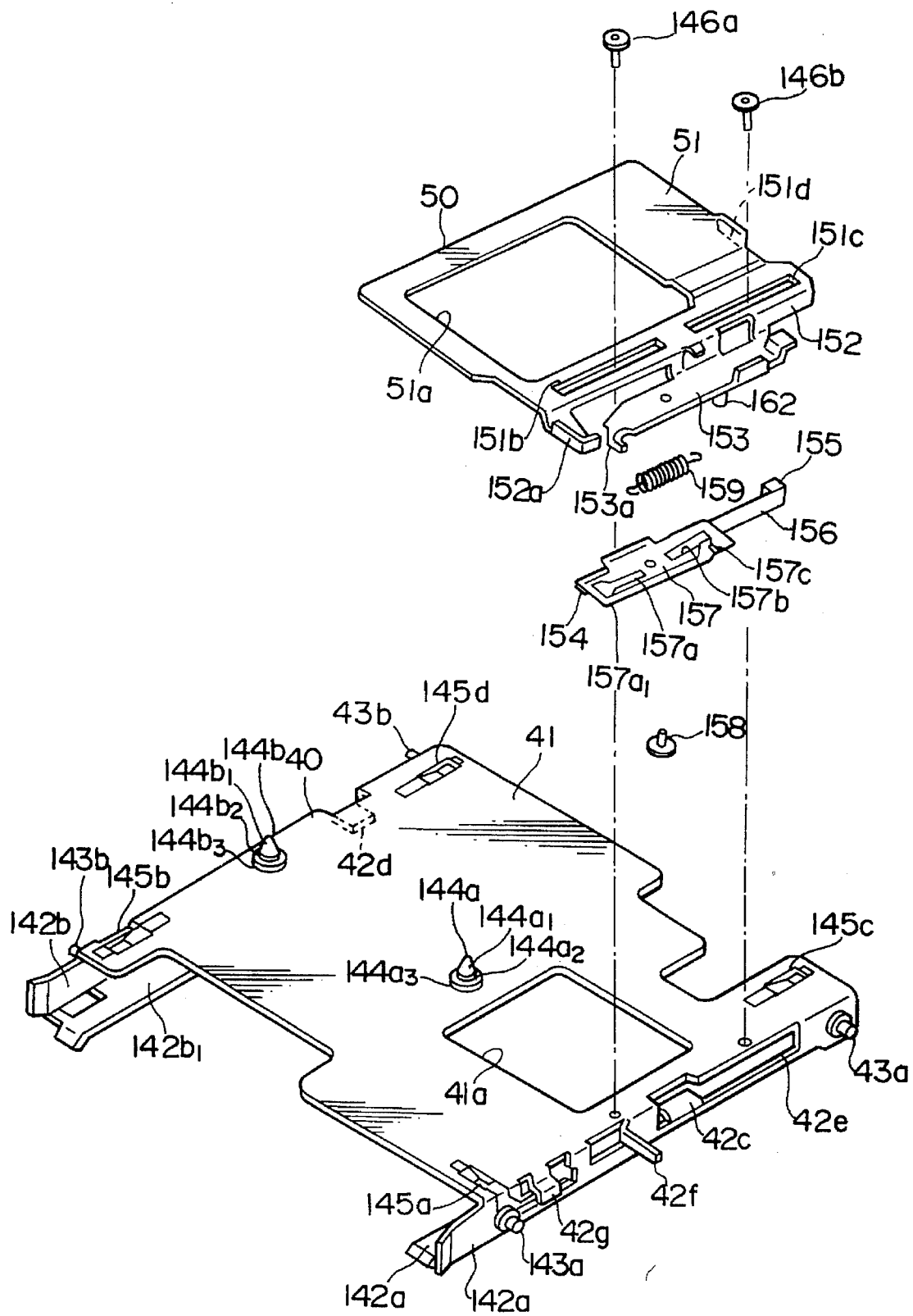
FIG. 9 is an exploded perspective view of the cartridge holder and the loading slider of the second embodiment.
Figure 10:
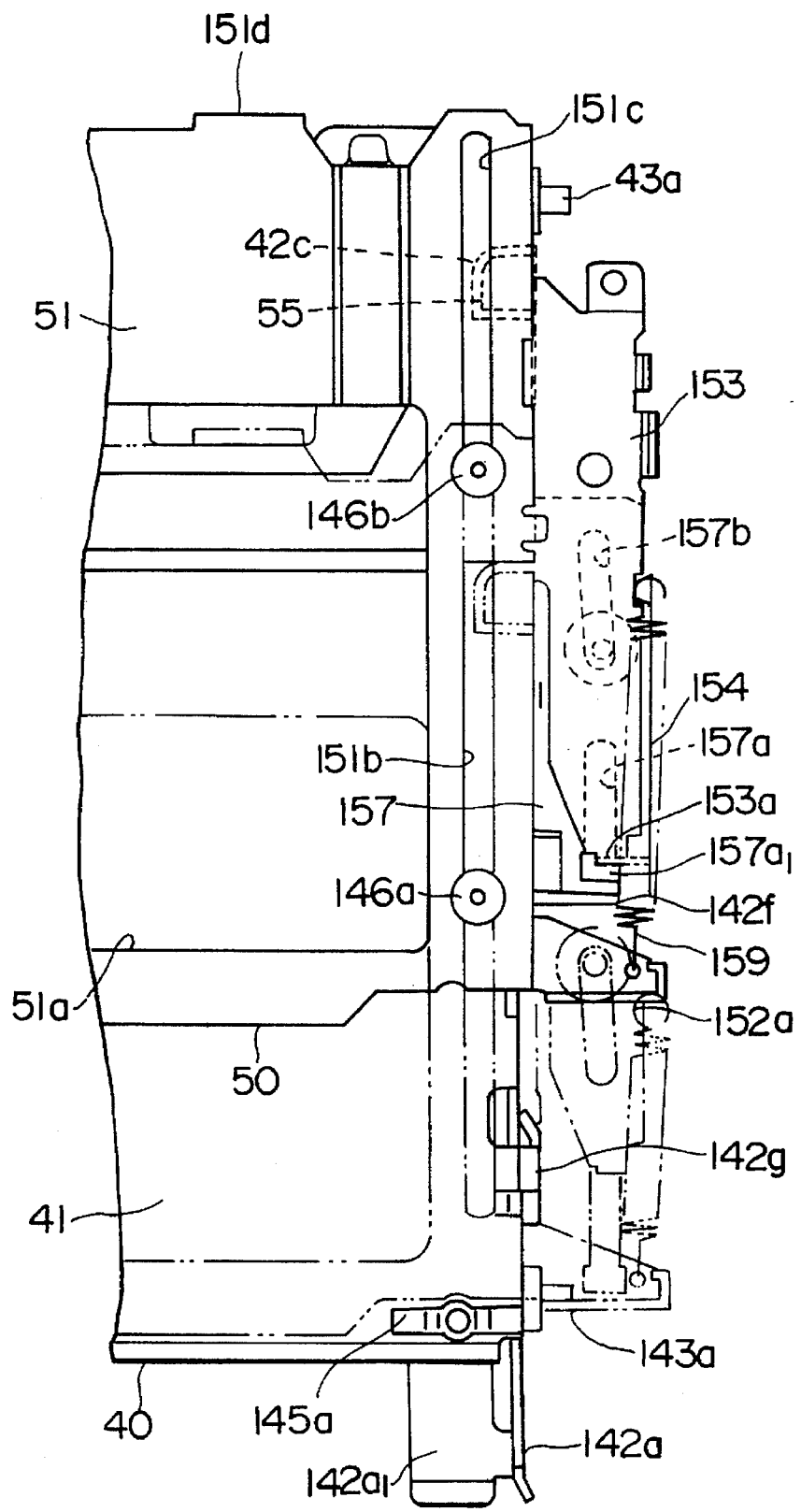
FIG. 10 is a plan view of a pan of the assembly of the cartridge holder and the loading slider shown in FIG. 9.

The construction of the cartridge holder 40 and loading slider 50 of the present embodiment is substantially similar to that of file above-described first embodiment, as may be seen in FIGS. 8 and 9. However, according to the present embodiment, the plate member 41 of the cartridge holder is provided with a pair of conical positioning pins 144a, 144b, located to the left of the cut-out 41a, as seen in FIG. 9. The top sections 144a1, 144b1 of the positioning pins 144a, 144b, are conical and are supported on cylindrical portions 144a2, 144b2. Flange portions 144a3, 144b3 are formed below the cylindrical portions 144a2, 144b2 with a specified gap between the flange portions 144a3, 144b3 and the surface of the plate member 41 of the cartridge holder 40. Further provided at the corner portions of the plate member 41 of the cartridge holder 40 are holding springs 145a, 145b, 145c, 145d, which may be of a plate spring type and integrally formed with the plate member 41. Such holding springs 145a, 145b, 145c, 145d securely retain the disc cartridge 70.

As also seen in FIG. 9, the loading slider 50 is of metal plate and substantially corresponds to the loading slider of the first embodiment. The horizontal plate portion 51 of the loading slider 50 has a width corresponding to substantially the right-hand half section of the plate member 41 of the cartridge holder 40 and has a flat shape with a length shorter than the longitudinal size of the plate member 41. Further, the horizontal plate portion 51 of the loading slider 50 has a cut-out portion 51a corresponding to the cut-out portion 41a of the carlridge holder 40. The horizontal plate portion 51 of the loading slider of the second embodiment is also provided with guide grooves 151b, 151c extending in a front to rear orientation of the plate portion 51. The guide grooves 151b, 151c are engaged by the guide pins 146a, 146b which pass through the plate member 41 of the cartridge holder 40. This construction allows the loading slider 50 to slide relative to the cartridge holder 40. At the rear side of the horizontal plate portion 51, a tab 151d is provided for engaging the forward edge of the disc cartridge 70 for limiting the degree of insertion thereof.

The loading slider 50 is also provided with a lock lever 154 attached to the horizontal side piece 153 thereof. As seen in FIG. 9, the lock lever 154 is formed by bending a sliding surface 157 horizontally from the upper edge of the base end of a leaf spring 156 which has fixed at the tip thereof an engaging claw 155. The claw 155 is made of synthetic resin or the like, and is engageable with the engaging portion 70g of the disc cartridge 70. To the front side of the sliding surface 157 of the lock lever 154, a first elongate guide hole 157a having an engaging edge 157a1 is formed, while to the rear side of the sliding surface 157, a second elongate guide hole 157b is formed. The second elongate guide hole 157b has a slightly inclined orientation and has a raised spring hook 157c formed at the side thereof substantially at the center of the second elongate guide hole 157b.

The lock lever 154 is installed in the longitudinal direction parallel to the bottom face of the horizontal side piece 153 of the loading slider 50 via an engaging pin 158 which is inserted through the elongated guide hole 157b. By this construction, an elongated guide hole 147a formed on the cartridge holder 40 is engaged by an engaging claw 153a which is formed by downward bending at the front of the horizontal piece 153. When the lock lever 154 slides rearwardly, the engaging edge 157a1 of the first elongated guide hole 57a is engaged with the engaging claw 153a. The lock lever 154 stretches a tension coil spring 159 between file spring hook 157c and a protruding thrust piece 152a formed by horizontal bending at the from of the downwardly projecting side portion 52 of the loading slider 50. The lock lever is energized to slide forward by the tension coil spring 159.

Thus, by having the lock lever 154 installed on the loading slider 50, the hook portion 155 at the tip of the leaf spring 156 protrudes toward the inside of the cartridge holder 40 from the right side 152 of the loading slider 50. The inner edge of the slide surface of the lock lever 154 makes contact with a strike member 42g, which projects at the front of the right side member 42 of the cartridge holder, when the loading slider 50 slides forward.

The above arrangement operates in conjunction with an insertion completion detecting switch 160 with an actuating lever 160a as disclosed hereinabove in connection with the first embodiment. The switch 160 is installed at the rear of the slide surface 153 of the loading slider 50 as shown in FIG. 8. An ejection completion detecting switch 161 with an actuating lever 161a is also provided. In addition, first and second swing plates having cam surfaces etc., are provided as in the above described first embodiment.

A fast electric circuit 700 is connected to the side of positioning switches 134, 135 installed on the sub-chassis 15 and a second electric circuit 701 is connected to the side of the disc insertion completion detection switch 160 and the ejection completion detection switch 161 installed on the slide surface 153 of the loading slider 50. The electric circuits are interconnected by means of a flexible wiring circuit board 702.

The flexible wiring circuit board 702 comprises a first circuit board 703, a second circuit board 704 and a connection wire section 705 having a narrow band-like configuration which connects the first and second circuit boards 703 and 704. The fast circuit board 703 is attached to the side of the electric circuit 700 of the positioning switches 134, 135 and the second circuit board is attached to the electric circuit 701 of the detector switches 160, 161.

The connection wire section 705 is fixed vertically on the circuit board 703 and has, in an initial state, a U-shaped slack portion 705a. The connection wire section 705 is given a half turn of torsion and is fixed on the side of the second circuit board 704 and arranged such that the U-shaped slack portion 705a is always predisposed downward.

Figure 11:
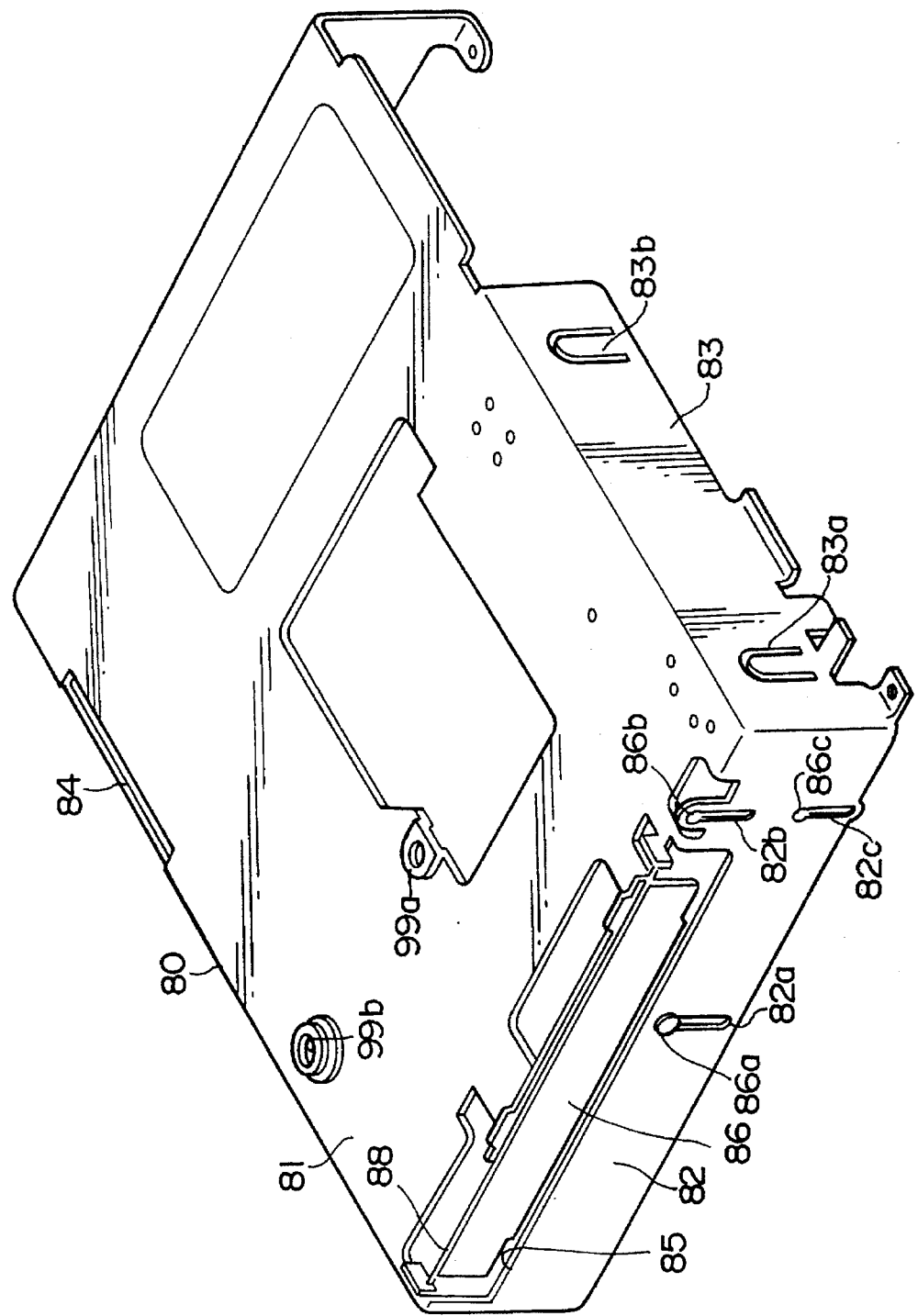
FIG. 11 is a perspective view of a sub chassis which houses and holds the disc cartridge loading apparatus of the second embodiment.
Figure 12:
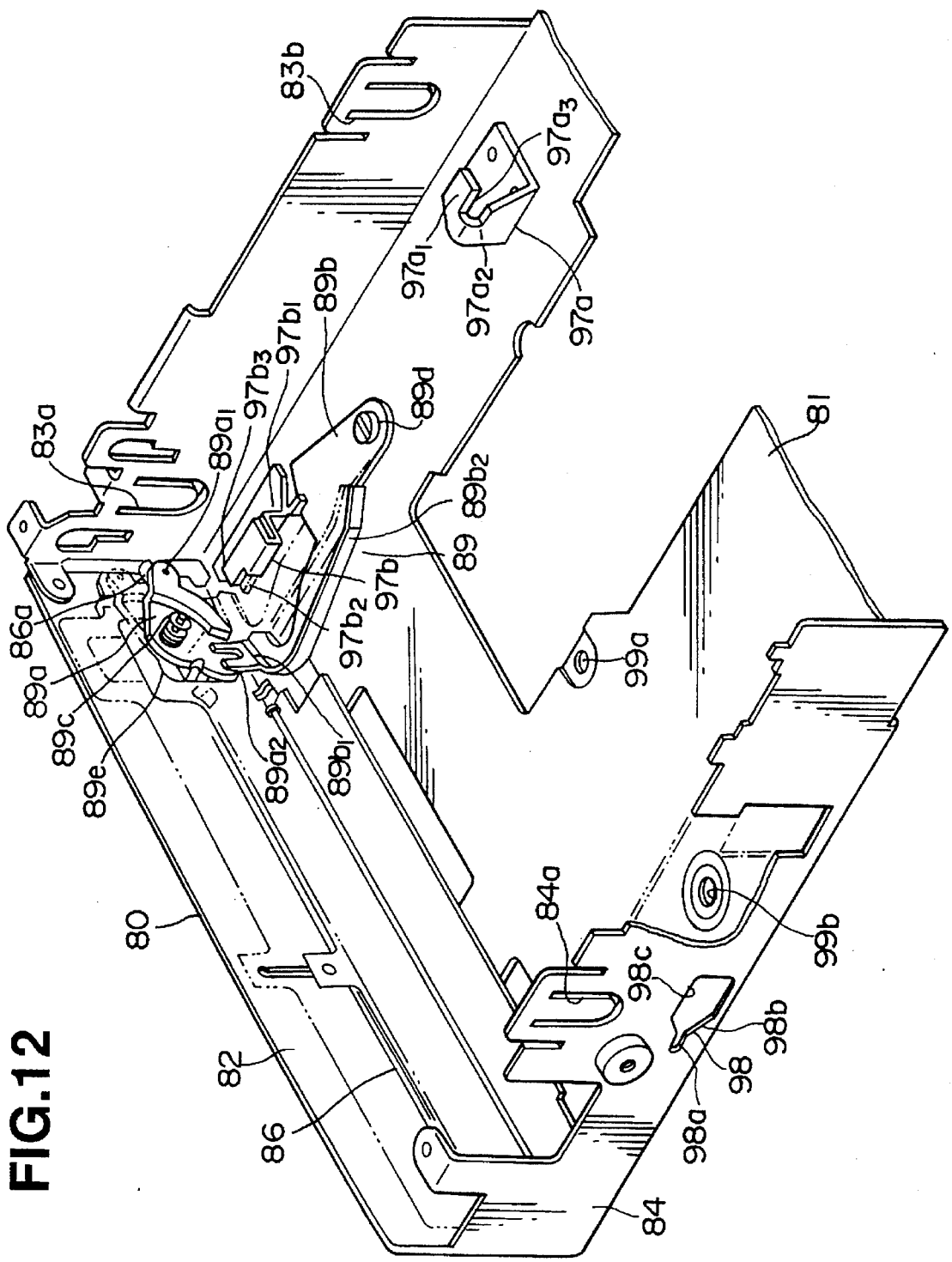
FIG. 12 is a cut-away perspective view of an inner portion of the sub chassis of FIG. 11.

Referring now to FIGS. 11 and 12, an outer sub chassis 80 which supports the disc cartridge loading apparatus 1 of the second embodiment will be described in detail. The sub chassis 80 is formed in a rectangular, box-like shape having a top surface 81, a front face 82 and side faces 83, 84. A disc cartridge insertion opening 85 is formed on the front face 82 and a shutter 86 is provided to open and close the insertion opening 85. An indicating plate 87, corresponding to the insertion opening 85 is further provided. (See FIG. 15.)

An actuator mechanism 89 opens and closes the shutter 86 in conjunction with sliding movement of the loading slider 50. As best seen in FIG. 12, the actuator mechanism 89 is located on the right side of the inside of the front face 82 of the sub-chassis 80. The actuator mechanism 89 comprises a rotary member 89a which is engaged with the shutter 86 and an oscillating member 89b which pivots in the horizontal direction in the inner right side of the top surface 81. The oscillating member 89b rotates by being pressed by the protruding thrust piece 152a upon sliding movement of the loading slider 50 (see FIG. 9).

The rotary member 89a is of substantially fan-shaped configuration and pivots on a shaft pin 89c located at its center. It has an engaging pin 89a1 installed so as to protrude on one side thereof and which is engaged with a forked claw 86a formed on the right-hand end of the shutter 86. A linkage pin 89a2 is installed protruding from the other end and is engaged with a rising forked claw 89b 1 at the front end of the oscillating member 89b. The oscillating member 89b is pivoted at the rear end by a screw pin 89d, and has a raised contact edge 89b2 for contacting with the protruding thrust piece 152a of the loading slider 50.

The rotary member 89a is always predisposed in the direction which will close the shutter 86. This is achieved by a coil spring 89e which is wound around the shaft pin 89c.

The disc cartridge loading apparatus 1 which is housed in the sub chassis 80 described above is supported via dampers 94, 95, 96 (see FIG. 7) such that the loading apparatus 1 is capable of slight movement in the above-mentioned X, Y and Z directions with respect to the sub-chassis 80 so as to minimize influence of external vibrations on the loading apparatus 1.

Figure 7:
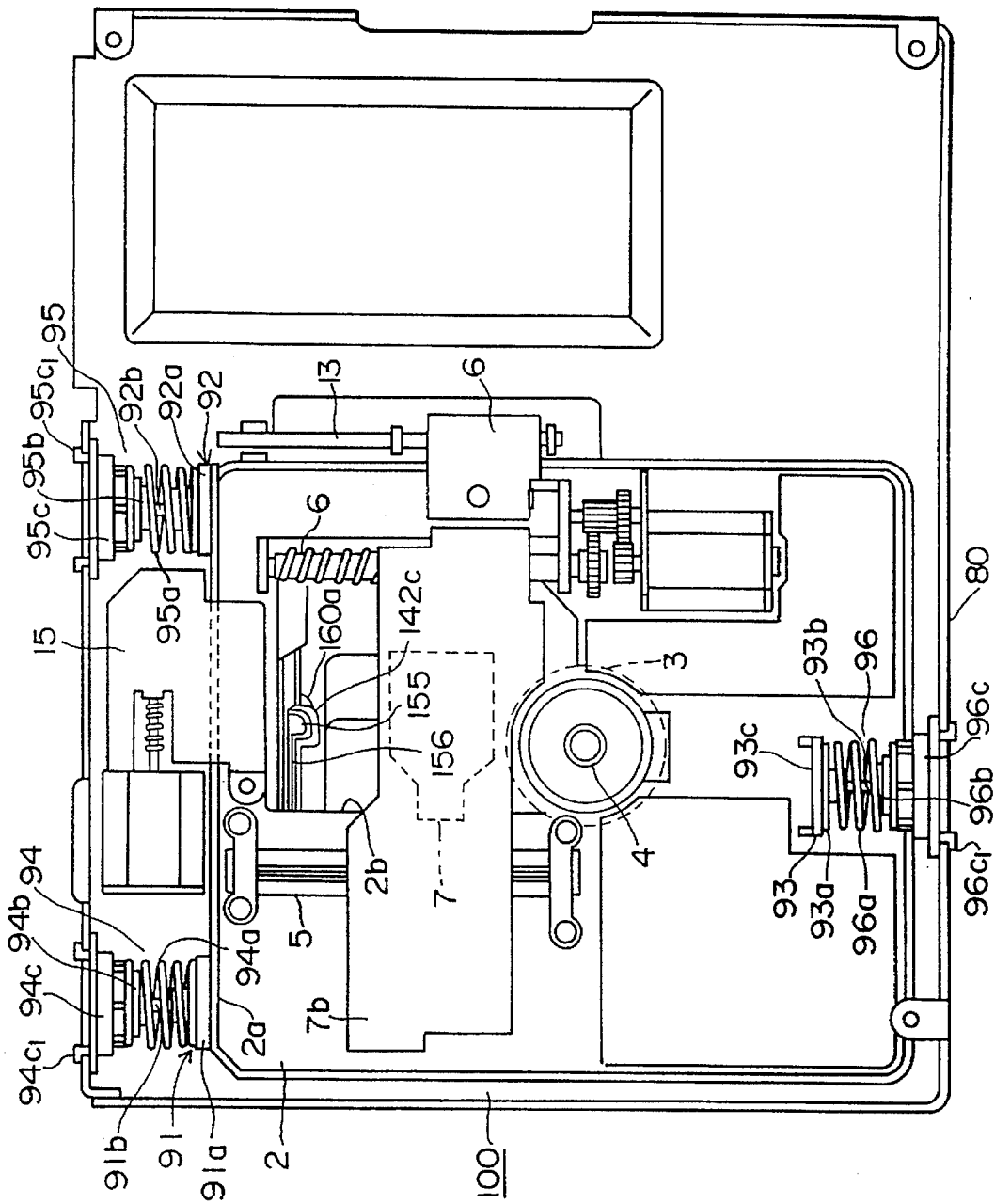
FIG. 7 is a bottom view of the disc loading apparatus of the second embodiment.

Accordingly, the chassis 2 of the disc cartridge loading apparatus 1 of the second embodiment is provided with support members 91, 92, 93 supporting the mechanism associated with the dampers 94, 95, 96. The support members 91, 92, 93 are provided at front and rear sides of the right side of the arrangement and at a lower center portion of the left side of the arrangement as seen in FIG. 7. The right side support members 91 and 92 comprise projecting support rods 91b, 92b at the center of circular flanges 91a, 92a which are attached directly to the right side 2a of the chassis 2. The left side support member 93 comprises a circular flange 93a and a support rod 93b, in a construction similar to the support members 91 and 92. However, the left side support member 93 is formed integrally with a leg piece 93c. The support member 93 is attached to the bottom of the chassis 2 at the center of the left side thereof via the leg piece 93c.

The disc cartridge loading apparatus 1 is supported by the sub chassis 80 via dampers 94, 95, 96 which are in turn supported by the support members 91, 92, 93 as described above. The dampers 94, 95, 96 comprise compression springs 94a, 95a, 96a, oil-filled elastic bodies 94b, 95b, 96b which are made of rubber or the like, and fixed bases 94c, 95c, 96c which are linked with the compression springs 94a, 95a, 96a by inserting and fitting the elastic bodies 94b, 95b, 96b into the compression springs 94a, 95a, 96a.

The dampers 94, 95, 96 are arranged between the chassis 2 of the disc cartridge loading apparatus 1 and the sub chassis 80. The compression springs 94a, 95a, 96a engage at one end with the flanges 91a, 92a, 93a of the support members 91, 92, 93. At the other end, the springs 94a, 95a, 96a engage with the fixed bases 94c, 95c, 96c which have engaging claws 94c1, 95c1, 96c1 which are formed on the outer end faces of the fixed bases 94c, 95c, 96c and which engage with engaging holes 83a, 83b, 84a formed in right and left side faces of the sub-chassis 80. (See FIG. 12).

According to the above, the disc cartridge loading apparatus 1 is supported in X, Y and Z directions with respect to the sub-chassis 80.

Since two dampers 94, 95 are installed on the right side and a single damper 96 is installed on the left side, the compression force of the single damper 96 is determined to be higher than that of the opposing two dampers 94, 95 by a degree so as to suitably balance the disc loading apparatus 1.

Figure 13:
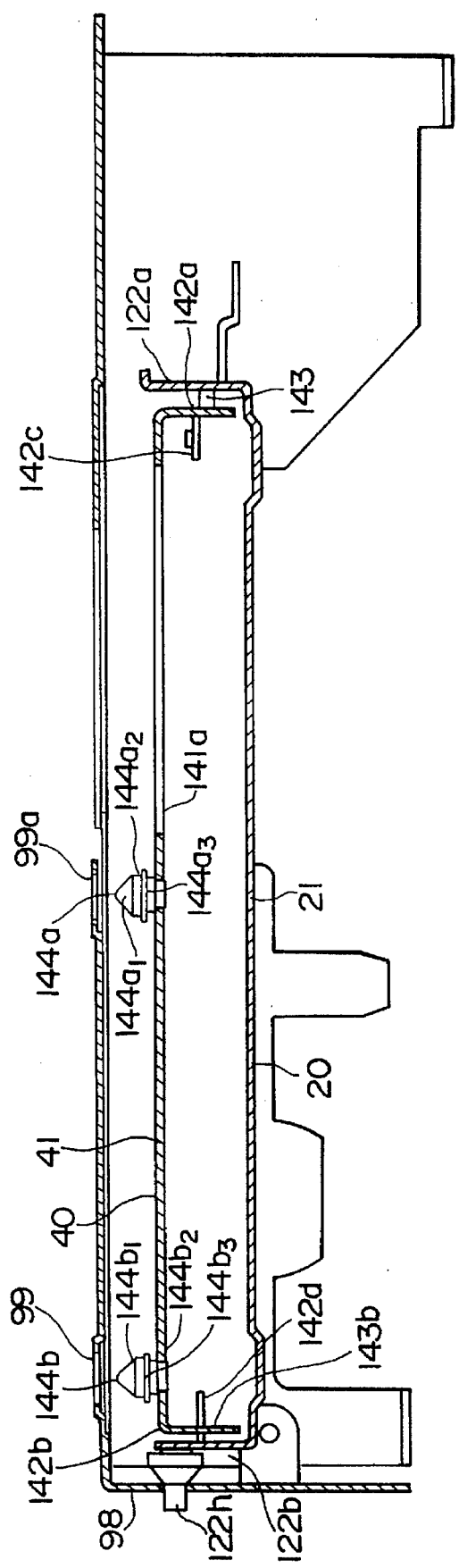
FIG. 13 is a cross-sectional view illustrative of the relationship of the main slider and the cartridge holder with respect to the sub chassis.

The sub-chassis 80 is further provided with an engaging mechanism so as to fix the position of the disc cartridge loading apparatus during loading and unloading operations. Referring to FIGS. 8, 12 and 13, the engaging mechanism, fixed on the right of the inner surface of the top face 81 of the sub-chassis 80, comprises an engaging support piece 97a wherein the support piece 122g located on the right side 122a of the main slider 20 may be inserted and engaged.

Additionally, an engaging support piece 97b is provided with which the support arm piece 136b of the rotary support body 136 is engaged. An engaging hole 98 is formed in the left side face 84 of the sub-chassis 80 wherein the support pin 122h, projected horizontally from the central portion of the left side 122b of the main slider 20 is engaged. A pair of engaging holes 99a, 99b is provided on the top face 81 of the sub-chassis 80 wherein the pair of positioning pins 144a, 144b which project from the plate member 41 of the cartridge holder 40 are inserted.

As seen in FIG. 12, the engaging support piece 97a installed at the rear right side has a horizontal section 97a1 and a vertical section 97a2. Further, a slit 97a3 is formed so as to partially divide the horizontal section 97a1 from the vertical section 97a2. The support piece 122g of the main slider 20 is inserted into the slit 97a3 so as to contact the horizontal section 97a1 while being supported by the vertical section 97a2. The engaging support piece 97b at the front right side is provided with an engaging groove 97b1 and guide pieces 97b2, 97b3 which incline upward and downward and are formed respectively at the front end of the engaging support piece 97b1. The support arm 136b of the rotary support body 136 is guided by the guide pieces 97b2 and 97b3 into the engaging groove 97b1, and is supported in the vertical direction.

Figure 14:
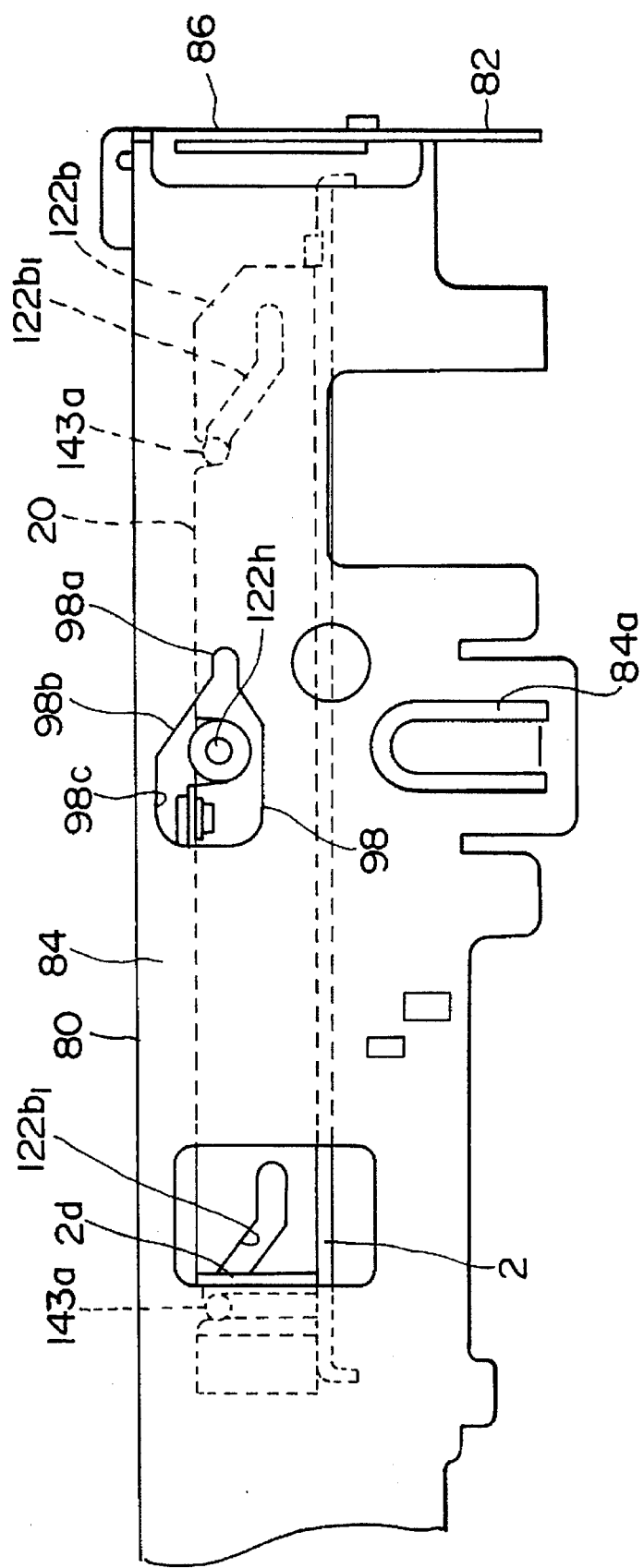
FIG. 14 is a left side view of the condition shown in FIG. 13.

As seen in FIG. 14, the engaging hole 98 is formed with an engaging groove 98a of which a from section thereof has a width nearly equal to or slightly larger than the diameter of the support pin 122h. The engaging hole 98 also includes a tapered guide section 98b which inclines from upper and lower sides toward the engaging groove 98a, and a wide hole 98c which continues rearward of the tapered guide section 98b. The guide pin 122h of the main slider 20 may be moved from the wide hole 98c, and, guided by the tapered guide section 98b, engaged with the engaging groove 98a according to sliding movement of the main slider 20. The guide pin 122h is securely supported when engaged with the engaging groove 98a.

Referring to FIGS. 11 and 13, one engaging hole 99a which receives the positioning pin 144a is formed as a true circle with a diameter equal to or slightly greater than the diameter of the cylindrical portion 144a2 of the positioning pin 144a. The other engaging hole 99b which receives the other positioning pin 144b is formed in an oval shape having a longitudinal diameter equal to or slightly greater than the diameter of the positioning pin 144b and having a larger lateral diameter. Thus the positioning pin 144a is positioned and supported in the longitudinal and lateral directions while the other positioning pin 144b is supported in the longitudinal direction only.

Figure 15:
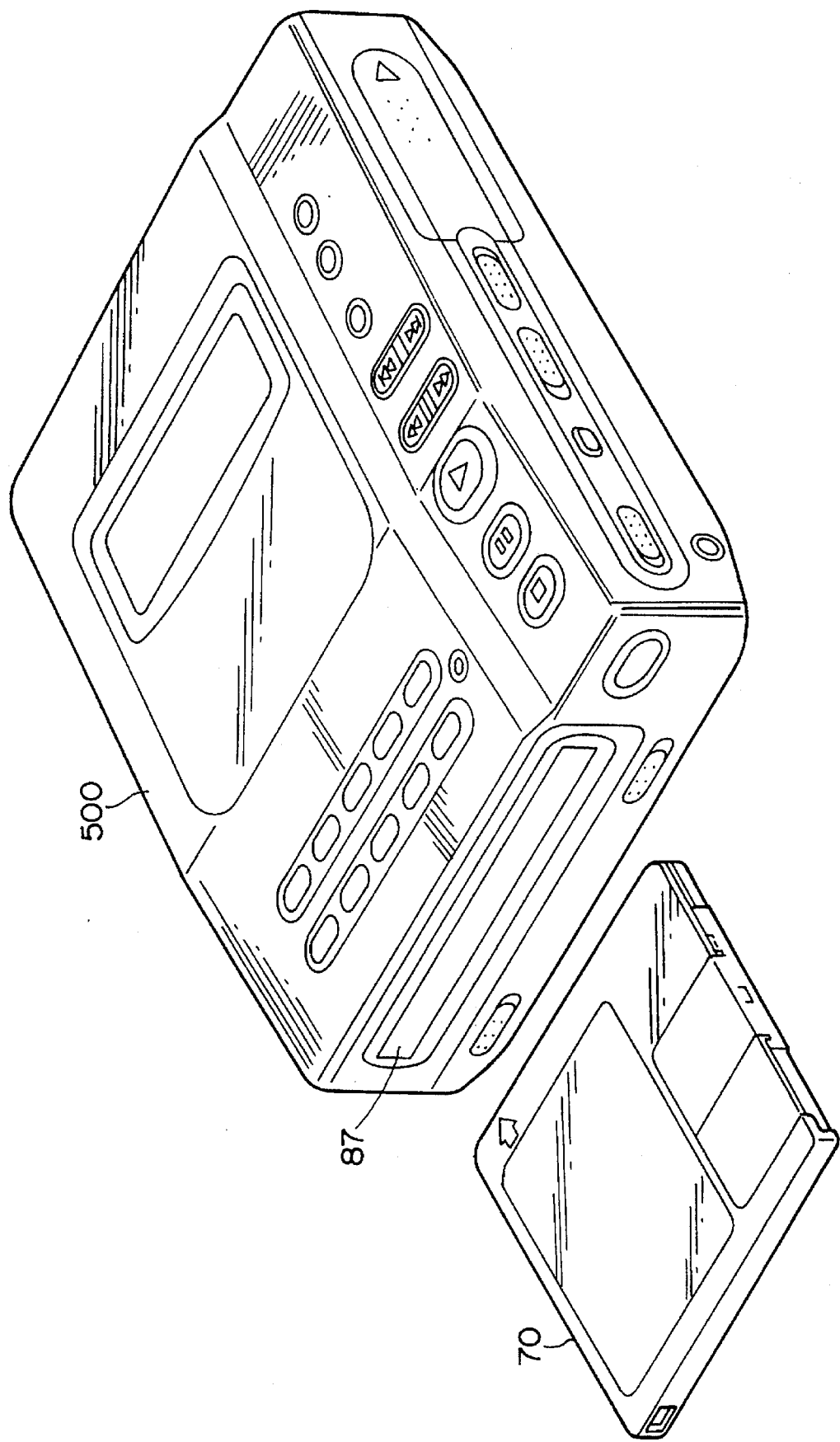
FIG. 15 is an external perspective view of a disc player equipped with a disc cartridge loading apparatus according to one of the first or second embodiments of the invention.

The above described disc cartridge loading apparatus as supported in the sub-chassis 80 may be housed in, for example, a disc reproducing and/or recording apparatus 500 as shown in FIG. 15.

When a disc cartridge 70 is loaded into the arrangement as described above, the head portions 18a, 18a of the positioning pins 18, 18 thereof are respectively inserted into the circular positioning guide opening 70e and the elongate guide opening 70f of the disc cartridge 70. Consequently, the disc cartridge 70 is securely and accurately positioned on the chassis 2 in the longitudinal and lateral directions according to the operation described previously in relation to the first preferred embodiment. However, according to the present embodiment, forward movement of the main slider 20 causes the support piece 122g formed on the upper edge of the rear of the right side 122a of the main slider 20 to interface with the horizontal section 97a1. By such movement, the support piece 122 is inserted into the slit 97a3 of the engaging support piece 97a which is fixed on the inner surface of the top face 81 of the sub-chassis 80. At the same time, the rotary support body 136 is rotated by the forked engaging piece 122f on the upper edge of the front side of the right side section 122a of the main slider 20 such that the support arm 136b is inserted into the engaging groove 97b1 of the engaging support piece 97b. In addition, the support pin 122h of the left-hand side section 122b of the main slider 20 is engaged in the engaging groove 98a of the engaging hole 98. The main slider 20 is thus positioned and held in the vertical direction with respect to the sub-chassis 80, that is to say, the Z direction, in addition to the X and Y directions.

In this condition, the lock lever 154, supported by the right side horizontal piece 153 of the loading slider 50, slides forward by force of the tensile coil spring 159. The hook portion 155 at the tip of the leaf spring 156 is thereby moved to protrude through the right side 142a of the cartridge holder 40 at a position below the projection 42c. (See FIG. 9).

As described above, in a state prior to loading, the main slider 20 and the cartridge holder 40 are positioned with respect to the sub-chassis 80 so that the whole of the disc cartridge loading apparatus 1 is supported in a positionally fixed state against the sub-chassis 80.

As the loading slider 50 is moved forward under this condition, the strike piece 152a thereof presses the oscillating member 89b of the shutter actuator mechanism 89 on the sub-chassis 80, causing the shutter actuator mechanism 89 to rotate. Thereby, the shutter 86 is pressed down via the rotary member 89a to open the opening 85, while the indicator plate 87 hangs down in front of the opened opening 85.

When the disc cartridge 70 is inserted into the cartridge holder 40, the hook portion 155 of the loading slider engages the engaging portion 70g of the disc cartridge 70 so as to pull the disc cartridge 70 back and forth according to movement of the loading slider 50. The main slider 20 slides so as to oppose the cartridge holder 40 and the loading slider 50 during loading and unloading operations. Thus, as with the above described first embodiment, smooth, secure loading and unloading of the disc cartridge can be accomplished with a simple construction.

Also, the disc cartridge 70, supported by the cartridge holder 40 and the loading slider 50, is lowered toward the main slider 20 such that the head portions 18a, 18a of the positioning pins 18, 18 thereof are respectively inserted into the circular positioning guide opening 70e and the elongate guide opening 70f of the disc cartridge 70. As a result, the disc cartridge 70 is securely and accurately positioned on the chassis 2 in the longitudinal and lateral directions (X and Y directions). Due to the construction set forth above, the disc cartridge 70 is also secured in the vertical Z direction during cartridge loading and unloading. Thus, according to the present embodiment, not only is the disc cartridge 70 securely positioned in the loading apparatus 1, but the loading apparatus 1 itself is securely positioned relative to the sub-chassis 80 in X, Y and Z directions during loading, unloading, and operation. Such secure positioning minimizes any influence of vibration of the disc reproducing and/or recording apparatus 500 or the sub-chassis 80 on the loading apparatus 1.

It will be noted that during loading and/or unloading operation, in case either the insertion completion detecting switch 160 or the ejection completion detecting switch 161 do not function properly, the motor 29 will not drive the loading slider 50. Moreover, the lock lever 154 will not depart from the strike section 142g of the cartridge holder 40 and therefore will not engage with the loading slider 50. Consequently, the lock lever 154 returns by force of the tensile coil spring 59 and the disc cartridge 70 is thereby pushed out of the cartridge holder 40 and misloading is prevented.

In the sequence of loading and unloading operations involving sliding movement of the main slider 20 and raising and lowering of the cartridge holder 40, the sliding motion of the main slider 20 releases the supporting piece 122g from the slit 97a3 of the engaging support piece 97a of the sub-chassis 80. Additionally, the rotary support body 136 rotates, thereby releasing the support arm piece 136b from the engaging groove 97b1 of the engaging support piece 97b. Further, the support pin 122h moves from the engaging groove 98a of the engaging hole 98 into the wide hole 98c, thus freeing the chassis 2, which is connected with the main slider 20, in the vertical direction. That is to say, vertical positional fixing of the chassis 2 relative to the sub-chassis 80 is canceled.

Also, as the cartridge holder 40 is moved down, the positioning pins 144a, 144b on the plate member 41 of the cartridge holder 40 are released from the engaging holes 99a, 99b located on the inner side of the top face 82 of the sub-chassis 80. The cartridge holder 40 (as well as the chassis 2) is thereby released from the fixed positional state in the longitudinal and lateral directions.

By the above operation, the disc cartridge loading apparatus 1 as a whole becomes capable of moving in the vertical, lateral and longitudinal directions (X, Y, Z) with respect to the sub-chassis 80.

Thus, according to the present invention, because the disc cartridge loading apparatus 1 is supported via the dampers 94, 95, 96 with respect to the sub-chassis 80, recording or reproducing of data on the magneto-optical disc 71 of the disc cartridge 70 can be securely carried out without trouble since the transmission of vibration from the disc reproducing and/or recording apparatus 500 or the sub-chassis 80 to the loading apparatus I is minimized.

Moreover, smooth loading and ejection of the disc cartridge 70 may be reliably accomplished since the position of the cartridge holder 40 exactly corresponds to the opening 85 of the sub-chassis 80 when the cartridge holder 40 is raised and positionally fixed as described above.

Since one positioning member is provided for positioning the main slider 20 in the Z direction via the rotary body 136 pivotally mounted on the main slider 20, efficient use is made of limited space for carrying out the engaging and releasing of the disc cartridge loading apparatus 1, and all operations thereof may be reliably carried out.

According to the invention, a disc cartridge loading apparatus is provided which allows the smooth loading and ejecting of disc cartridges with high reliability. The apparatus features a simplified construction using a reduced number of parts. Thus, costs and weight as well as size and complexity of the disc cartridge playing/recording apparatus are reduced.

It will be noted that, although the above-described embodiments are described with reference to a magneto-optical type cartridge apparatus, the present invention is not limited thereto, but may alternatively be employed for any other type of disc cartridge loading/unloading application.

It will further be noted that, while various configurations of the engaging members of the second embodiment have been disclosed, engagement may also be accomplished by using a plurality of identical engaging members such as the arrangement of the support piece 122g for example, if space permits. Also, although coil springs and oil-filled elastic bodies have been described as the dampers 94, 95, 96, gas-filled air cushions, or rubber or metallic spring members alone may alternatively be preferably employed.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

We claim:

1. A disc cartridge loading apparatus including optical and magnetic heads for reproducing and/or recording data on a magneto-optical disc comprising:

a chassis;

a main slider slidably coupled to the chassis for slidable movement in a rearward direction and a forward direction, the main slider having side members;

a cartridge holder movably coupled to the main slider for movement in an upward direction and a downward direction relative to said main slider, said cartridge holder being configured to receive a disc cartridge between side portions thereof;

a loading slider slidably coupled to said cartridge holder and having a hook portion configured to engage an engaging groove on a side of said disc cartridge for sliding said disc cartridge in the forward and rearward directions relative to said cartridge holder, the loading slider being slidably coupled to the cartridge holder for slidable movement in the forward and rearward directions relative to the cartridge holder;

drive means for selectively moving said loading slider so that said hook portion moves in a loading direction and an unloading direction;

means for raising and lowering said cartridge holder and said loading slider, said raising and lowering means being operatively coupled to slidable movement of said main slider;

a rack arranged on an outer side of said main slider and a drive gear engaged to said rack and driven by said drive means, said loading slider being operatively coupled to said drive gear, wherein said disc cartridge engaged with said hook portion of said loading slider is selectively drawn in and ejected from said loading apparatus; said cartridge holder and said loading slider being coupled to said main slider so that the cartridge holder and loading slider move in said upward direction and said downward direction when the main slider moves in the forward and rearward directions, respectively; and a supporting arm having a magnetic head mounted thereto for recording data on the disc contained in said disc cartridge, said supporting arm being supported in a manner that is movable in a vertical direction with respect to said chassis via a cam engaged with a cam groove formed in said rack of said main slider.

2. A disc cartridge loading apparatus as set forth in claim 1, wherein: said cam groove has at least three stepped portions corresponding to three vertical positions of said supporting arm, the three vertical positions including a standby position, in which the magnetic head is furthest from said disc, a reproducing position, in which said magnetic head is proximate said disc, and a recording position, in which said magnetic head is closely proximate said disc.

3. A disc cartridge loading apparatus as set forth in claim 1, wherein: a projection is formed at an inner side of at least one of the side portions of said cartridge holder, the projection being configured to open or close a shutter of said disc cartridge according to a loading or an unloading operation.

4. A disc cartridge loading apparatus as set forth in claim 3, further comprising: a switch for detecting completion of insertion of said disc cartridge, the switch being located rearwardly of said projection.

5. A disc cartridge loading apparatus as set forth in claim 4, wherein said projection is formed at an outer side of said cartridge holder and said switch is located on an outer side of a side portion of said loading slider so as to oppose said projection.

6. A disc cartridge loading apparatus as set forth in claim 1, wherein said loading slider is slid forward and backwards into and out of said cartridge holder via a pin mounted eccentrically on said drive gear.

7. A disc cartridge loading apparatus as set forth in claim 2, further comprising a pair of protruding portions arranged on said outer side of said main slider and spaced by a prescribed distance; and a pair of positioning switches arranged on a side portion of said chassis facing to said pair of protruding portions to detect a reproducing position and a recording position of said main slider, respectively.

8. A disc cartridge loading apparatus as set forth in claim 1, wherein said main slider is supported on said chassis by a pair of guide pins, said guide pins further being active to engage a pair of positioning holes of said disc cartridge when said cartridge holder is lowered to assume a fully loaded condition of said disc cartridge.

9. A disc cartridge loading apparatus as set forth in claim 8, wherein said pair of guide pins have semi-circular head portions and cylindrical shaft portions.

10. A disc cartridge loading apparatus as set forth in claim 1, wherein: the loading slider is slidably mounted on the cartridge holder in an insertion direction of the disc cartridge to slide according to a loading/eject action of the disc cartridge, a lock lever is slidably and rotatably linked to the loading slider and supports said hook portion which engages with said engaging groove of said disc cartridge, wherein movement of the loading slider in the loading direction takes in the disc cartridge inserted in the cartridge holder and engaged by the hook portion, and movement of the loading slider in the unloading direction pushes out the disc cartridge to a specified position, and sliding movement of the lock lever with respect to the loading slider pushes out the disc cartridge further.

11. A disc cartridge loading apparatus as set forth in claim 10, wherein the hook portion is installed via a leaf spring.

12. A disc cartridge loading apparatus as set forth in claim 10, wherein: the lock lever is biased toward an unloading position with respect to the loading slider by a spring member, said biasing being locked when said lock lever slides toward a loading position.

13. A disc cartridge loading apparatus as set forth in claim 10, wherein the cartridge holder is provided with a release member to release locking by the lock lever of the loading slider.

14. A disc cartridge loading apparatus as set forth in claim 1, further comprising: an outer casing supporting the chassis via a plurality of damper mechanisms such as to be movable in X, Y and Z orthogonal directions relative said outer casing.

15. A disc cartridge loading apparatus as set forth in claim 14, wherein: said disc cartridge loading apparatus includes engaging members engageable with corresponding engaging members on said outer casing so as to positionally fix said disc cartridge loading apparatus in said X, Y and Z directions during movement in the upward direction of said cartridge holder.

16. A disc cartridge loading apparatus as set forth in claim 15, wherein said cartridge holder is fixed in said X and Y directions and said main slider is fixed in said Z direction during an upward movement of said cartridge holder.

17. A disc cartridge loading apparatus as set forth in claim 15, wherein: the engaging members for the cartridge holder include a plurality of shaft pins of conical shape, the shaft pins being inserted in engaging holes formed in the outer casing for positioning the cartridge holder in the X and Y directions with respect to the outer casing.

18. A disc cartridge loading apparatus as set forth in claim 17, wherein at least one of said engaging members active for positioning said main slider relative to the outer casing is pivotally mounted and comprises a rotary support body which is rotated according to a sliding motion of the main slider.

19. A disc cartridge loading apparatus as set forth in claim 14, wherein: a pair of said damper mechanisms are set on a first side of said loading apparatus arranged between said first side and a corresponding side of said outer casing and a single damping mechanism is arranged on a second side of said loading apparatus opposing said first side of said loading apparatus, a spring force of said single damping mechanism being greater than a spring force of either of said pair of damper mechanisms by a predetermined degree.

* * * * *